US012734615B2

(12) United States Patent
Weber et al.

(10) Patent No.: US 12,734,615 B2
(45) Date of Patent: Sep. 15, 2026

(54) METHOD FOR MONITORING THE CONDITION OF A LASER MACHINING HEAD, AND LASER MACHINING SYSTEM FOR CARRYING OUT SAID METHOD

(71) Applicant: PRECITEC GMBH & CO. KG, Gaggenau (DE)

(72) Inventors: Marian Weber, Karlsruhe (DE); Niklas Weckenmann, Rastatt (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 434 days.

(21) Appl. No.: 18/025,338

(22) PCT Filed: Sep. 8, 2021

(86) PCT No.: PCT/EP2021/074726
§ 371 (c)(1),
(2) Date: Mar. 8, 2023

(87) PCT Pub. No.: WO2022/053526
PCT Pub. Date: Mar. 17, 2022

(65) Prior Publication Data
US 2024/0024987 A1 Jan. 25, 2024

(30) Foreign Application Priority Data
Sep. 9, 2020 (DE) ........................ 102020123479.1

(51) Int. Cl.
*B23K 31/00* (2006.01)
*B23K 26/70* (2014.01)
*B23K 31/12* (2006.01)

(52) U.S. Cl.
CPC .......... *B23K 31/006* (2013.01); *B23K 26/702* (2015.10); *B23K 31/12* (2013.01)

(58) Field of Classification Search
CPC ..... B23K 31/006; B23K 26/702; B23K 31/12
USPC .......................................................... 73/760
See application file for complete search history.

(56) References Cited

U.S. PATENT DOCUMENTS 10,083,589 B2 * 9/2018 Winkler ............... B23K 26/034
10,556,295 B2 * 2/2020 Izumi .................. B23K 26/066
2010/0276403 A1 * 11/2010 Reitemeyer .......... B23K 26/702 219/121.67
2022/0080528 A1 * 3/2022 Ohno .................... B23K 26/38
(Continued)

FOREIGN PATENT DOCUMENTS

DE 10113518 A1 * 10/2002 ........... G01N 21/896
DE 102008058422 A1 * 5/2010 ............. B23K 26/03
(Continued)

*Primary Examiner* — Stephanie E Bloss
*Assistant Examiner* — Kevin C Butler
(74) *Attorney, Agent, or Firm* — DINSMORE & SHOHL LLP

(57) ABSTRACT

A method for monitoring the condition of a laser machining head includes the steps of: detecting current measurement data by means of at least one sensor unit arranged within the laser machining head, determining an input vector based on the acquired current measurement data; and determining an output vector by applying a model trained by machine learning to the input vector, said output vector containing estimated current condition data of at least two elements of the laser machining head.

14 Claims, 14 Drawing Sheets

(56) References Cited

U.S. PATENT DOCUMENTS

| | | | | |
|---|---|---|---|---|
| 2022/0331911 | A1* | 10/2022 | Boco | B23K 26/707 |
| 2024/0024987 | A1* | 1/2024 | Weber | B23K 26/702 |

FOREIGN PATENT DOCUMENTS

| | | | | | |
|---|---|---|---|---|---|
| DE | 10113518 | B4 | | 5/2016 | |
| DE | 102018204137 | A1 | | 9/2018 | |
| DE | 102017205713 | A1 | * | 10/2018 | G06N 3/045 |
| DE | 102018214063 | A1 | | 2/2019 | |
| DE | 102018128801 | A1 | | 5/2019 | |
| DE | 102018128952 | A1 | | 5/2019 | |
| DE | 102018102828 | A1 | | 8/2019 | |
| DE | 102019000457 | A1 | * | 8/2019 | G06N 3/08 |
| DE | 102018129441 | A1 | * | 5/2020 | B23K 31/125 |
| DE | 102020200308 | A1 | | 8/2020 | |
| DE | 102020123479 | A1 | * | 3/2022 | B23K 26/702 |
| EP | 1488882 | B1 | | 7/2006 | |
| JP | 2012076088 | A | * | 4/2012 | |
| JP | 6564412 | B2 | * | 8/2019 | B23K 26/702 |
| JP | 6892400 | B2 | * | 6/2021 | G06N 3/092 |
| JP | 6975190 | B2 | * | 12/2021 | B23K 26/082 |
| WO | WO-2010057662 | A1 | * | 5/2010 | B23K 26/04 |
| WO | WO-2023004155 | A2 | * | 1/2023 | C22F 1/183 |

* cited by examiner

METHOD FOR MONITORING THE CONDITION OF A LASER MACHINING HEAD, AND LASER MACHINING SYSTEM FOR CARRYING OUT SAID METHOD

CROSS-REFERENCE TO RELATED APPLICATIONS

This application is the U.S. National Stage of PCT/EP2021/074726 filed on Sep. 8, 2021, which claims priority to German Patent Application 102020123479.1 filed on Sep. 9, 2020, the entire content of both are incorporated herein by reference in their entirety.

FIELD OF THE INVENTION

The present invention relates to a method for monitoring the condition of a laser machining head and a laser machining system with a laser machining head which is configured to carry out said method. The present invention relates in particular to a method for monitoring the condition of a laser machining head and of elements, in particular optical elements, of the laser machining head using machine learning models or algorithms.

BACKGROUND OF THE INVENTION

In a laser machining system, also referred to as a laser machining apparatus or laser machine, for machining a workpiece using a laser beam, the laser beam emerging from a laser light source or one end of a laser optical fiber is focused or collimated onto the workpiece to be machined using beam guidance and focusing optics in order to locally heat the workpiece up to melting temperature in a machining area. Machining mach comprise separating workpieces, for example laser cutting, or joining, i.e. permanently connecting workpieces, in particular laser welding, laser deposition welding or laser soldering. The laser machining system usually includes a laser machining head for radiating the laser beam onto the workpiece, said laser machining head including the beam guiding and focusing optics and other elements.

Elements and components of the laser machining head, in particular optical elements for beam guidance and focusing, may become soiled with dirt in commercial use and/or deteriorate due to wear and/or aging effects. Due to these changes, the absorption of the laser beam by the elements may change, in particular increase, so that a desired performance of the laser machining system is no longer achieved. Furthermore, due to the increased absorption, the laser beam experiences a deviation in its focus position from a reference focus position desired for the process, i.e. from a target focus position. This effect is also known as "dynamic focus shift". The dynamic focus shift may lead to deterioration in the laser machining process or the machining result. In the case of laser beam cutting, this may manifest itself, for example, in poor cutting edge quality, i.e. a high level of roughness, slag formation, combustion artifacts and/or burr formation on the lower edge of the cut, up to and including interruption of the cut, which can significantly affect a manufacturing process and the production of laser-machined materials and workpieces, in particular by delayed production times and unplanned waste of material. Furthermore, the absorption of the laser beam by components or optical elements, in particular by lenses of the beam guiding and/or focusing optics or protective glasses, harbors the risk of irreparable damage to the laser machining head. Early detection or prediction of soiling and/or deterioration of the optical system and optical elements of the laser machining head can prevent these negative consequences.

In DE 10113518 B4, soiling of a protective glass is measured by comparing temperature and scattered light values with reference values in order to generate an error signal when the reference values are exceeded. Despite the comparison with reference values, the temperature and scattered light values are not always meaningful and must be related to additional boundary conditions, e.g. the current laser power, the ambient temperature, etc. The interpretation of the relationships requires expert knowledge and is not intuitively evident from the measurement values.

The evaluation of measurement data with the aid of classic signal processing, for example by means of a analysis of a function, a comparison with empirically determined threshold values or a Fourier transformation, often does not offer a meaningful assessment of the condition of a protective glass since boundary conditions such as ambient temperatures or the currently applied laser power often are not (or cannot be) taken into account sufficiently. Due to the evaluation based on threshold values lacking complexity, this provides only an indicator at best.

Usually, tools or additional devices are required to monitor the condition of the laser machining head, in particular the protective glass, or a separate test setup for checking optical elements has to be provided. This means that the test cannot be carried out directly in the initial condition or in the structure of the laser machining system itself, which leads to delays in production. If elements have to be removed from the laser machining head for testing, there is also an increased risk of soiling.

Typically, only individual elements or components of a laser machining head are examined. This allows a statement to be made as to whether a component is failing or degraded, but not as to what the overall condition of the laser machining head is. For example, the laser machining head may still be used with a slight degradation of a protective glass, which is arranged at a nozzle opening of the laser machining head in the vicinity of the machining area. However, if optical elements such as the focusing lens are compromised, continued use is not recommended or impossible.

In the current state of the art, only optical components are monitored. The impact of degradation or failure of mechanical and electrical components, such as motors or sensor and control boards, is not taken into account when monitoring the condition of a laser machining head.

SUMMARY OF THE INVENTION

It is an object of the present invention to provide a method for monitoring the condition of a laser machining head and/or at least one element, in particular an optical element, a mechanical element, an electrical element or an electronic element, of the laser machining head and a laser machining system for carrying out said method. Furthermore, it is an object of the present invention to provide a method and a laser machining system for carrying out said method which enable simple and rapid condition monitoring when the laser machining head is ready for use, i.e. without removing the at least one element.

Furthermore, it is an object of the present invention to provide a method for condition monitoring and a laser machining system for carrying out said method which make it possible to output a result of the condition monitoring, in particular an estimated current condition, to an operator of the laser machining head. It is a further object of the present invention to provide a method and a laser machining system for carrying out said method which make it possible to issue a recommendation for action to the operator based on the result of the condition monitoring.

It is also an object of the present invention to specify a method for condition monitoring and a laser machining system for carrying out said method which make it possible to carry out a finely tuned method for a given configuration of a laser machining head or for a given laser machining head.

One or more of these objects are achieved by the subject matter disclosed herein. Advantageous embodiments and further developments are also disclosed.

The invention is based on the idea to carry out, for condition monitoring of a laser machining head, a condition determination of the laser machining head or at least one element thereof, in particular at least one optical element, using machine learning models or algorithms (ML models or ML algorithms) based on measurement data, for example from scattered light, temperature and/or pressure sensors in the laser machining head, process parameters and/or machine data. Based on the determined condition of the laser machining head or an element thereof, recommendations for measures or actions may be provided to an operator. The respective condition may be determined based on measurement data from at least one sensor unit which is arranged in or on the laser machining head and may comprise a sensor for scattered light, temperature and/or pressure. Further process data and environmental influences, for example an ambient air temperature and/or an ambient air humidity, may also be taken into account.

According to a first aspect of the present invention, a method for monitoring the condition of a laser machining head is provided, said method comprising the steps of: acquiring measurement data by means of at least one sensor unit arranged on or in the laser machining head, determining an input vector based on the acquired measurement data; and determining an output vector by applying a model trained by machine learning (ML model) to the input vector, the output vector containing estimated condition data from at least two elements of the laser machining head and/or the laser machining head, preferably for determining or assessing the overall condition of the laser machining head.

Instead of an input vector, an input tensor may also be determined. In this case, also an output tensor is accordingly determined instead of an output vector. In other words, any embodiment described herein that has an input vector may instead include an input tensor. The same applies to the output vector and the output tensor.

Measurement data may include a time profile of various measurement variables and/or may include individual values of the measurement variables. The measurement data may be values of the respective measurement variables which are measured or acquired during a laser machining process or a test cycle. These values may map the time profile of the respective measurement variable.

The measurement data may include time profiles and/or values of at least one of the following measurement variables: humidity, humidity in an interior space of the laser machining head, humidity of an area surrounding the laser machining head, temperature, temperature of an area surrounding the laser machining head, temperature of a housing of the laser machining head, a temperature in an interior space of the laser machining head, a temperature of an element of the laser machining head, a coolant temperature, a temperature radiation intensity, a radiation intensity, a scattered light intensity, an intensity of a radiation reflected and/or scattered by an element of the laser machining head, an intensity of scattered light in an interior space of the laser machining head, an intensity of scattered light of an optical element, electric currents from or to an element, electric voltages at an element, communications signals of an element, a gas pressure in an interior space of the laser machining head, a gas pressure between two optical elements and/or on an optical element, an acceleration of an element of the laser machining head and/or the laser machining head, and a vibration of an element of the laser machining head and/or the laser machining head.

Furthermore, the input vector may be determined based on at least one process parameter or on process data. Process data may include a time profile of different process parameters and/or may include individual values of the process parameters. The process data may be measured or acquired, or specified by the system control or the operator, for example. The process data may include values of the respective process parameters which are measured or acquired during a laser machining process or a test cycle. These values may map the time profile of the respective process parameter. The process parameters may include laser parameters, machining parameters and/or environmental parameters. The laser parameters may include parameters of a laser source for generating the laser beam, for example a current laser power, a pulse peak power, a pulse length, a pulse frequency, a wavelength, a beam parameter product and/or a fiber diameter. The machining parameters may include a focus position of the laser beam, a gas pressure, a feed rate of the laser machining head, a type of gas (e.g. nitrogen, oxygen, compressed air, etc.), a nozzle type, a nozzle diameter, an imaging ratio of the optical system, a current acceleration of the laser machining head, a distance of the laser machining head to a workpiece to be machined and/or actuator data of the laser machining head and/or other machine components. The environmental parameters may include an ambient air temperature and/or an ambient air humidity. The feed rate may refer to a speed of the laser machining head relative to a workpiece to be machined.

The condition of the laser machining head or individual elements thereof may be specified or described by at least one condition variable. The condition variable may have a plurality of values, also called "condition values". The condition values of one or more condition variables form the condition data. The condition of the laser machining head or individual elements thereof may therefore be described or represented by corresponding condition data.

The condition data may include data on at least one of: a type of soiling of an element, a degree of soiling of an element, a degree of wear of an element, a degree of aging of an element, a remaining service life of an element, a changed focal length of an element, a deviation of a current focus position of the laser beam (actual focus position) from a target focus position, and an indication of the functionality of the laser machining head.

The method for condition monitoring may be carried out when the laser machining system is in a functional setup or state. In other words, the at least one element remains installed in the laser machining head during the method for condition monitoring.

In particular, the method for condition monitoring may be carried out during a laser machining process. The laser machining process may comprise laser cutting, laser welding and/or laser cladding. The output vector may be determined in real time or continuously during a laser machining process. The steps of acquiring measurement data, determining the input vector and determining the output vector may be carried out continuously, repeatedly and in parallel, in particular in parallel in terms of time.

Alternatively, the method may be carried out during a test cycle in which at least one process parameter is predetermined. In particular, the output vector may be determined during the test cycle. As a result, the accuracy of the estimated current condition data can be increased. The test cycle may include predetermined time profiles for at least one process parameter, such as laser power, focus position and/or gas pressure, and/or with at least one predetermined constant process parameter, such as laser power, focus position and/or gas pressure. The test cycle may be carried out with or without a workpiece. In the first case, the test cycle may be carried out as a laser machining process with predetermined time profiles for at least one process parameter, such as laser power, focus position and/or gas pressure, and/or with at least one predetermined constant process parameter, such as laser power, focus position and/or gas pressure. For example, a focus position of the laser beam may be adjusted during the test cycle such that at least one optical element of the laser machining head, in particular a focusing lens, a collimating lens, a beam splitter or a protective glass, is maximally illuminated. In addition, the focus position of the laser beam may be adjusted during the test cycle in such a way that the at least one optical element is minimally illuminated, i.e. the at least one optical element is in focus. A laser power during the test cycle may be constant. During the test cycle, the laser machining head may be subjected to a gas pressure that is greater than an ambient pressure. Acquiring the measurement data, determining the input vector and/or determining the output vector may be carried out during a laser machining process and/or the test cycle. Applying the gas pressure to the laser machining head and/or setting the focus position may be carried out by the computing unit described below or may be controlled thereby.

The method may further comprise automated intervention or control of the laser machining process based on the determined output vector. The laser machining process may be controlled by changing at least one process parameter, for example the laser power, the focus position of the laser beam, the gas pressure, the feed rate of the laser machining head, the imaging ratio, or the distance between the laser machining head and the workpiece. The control may be used to (re)establish a desired target condition or to ensure a desired machining result of the laser machining process.

The at least one element my comprise an optical element, in particular a protective glass, a beam splitter, a mirror, a lens, a lens group, a lens package, a focusing lens, focusing optics, collimating optics and/or a collimating lens. The at least one element may comprise a mechanical element, in particular an actuator, a motor, a nozzle, a nozzle electrode, a ceramic part, a cutting gas duct, or a cooling element. The at least one element may further comprise an electrical and/or electronic element, in particular a board, a control board, a communication board, a power component, or a motor control.

Determining the output vector may comprise determining estimated condition data of the at least two elements of the laser machining head by applying the model trained by machine learning to the input vector and determining estimated condition data of the laser machining head by applying the model trained by machine learning to the estimated condition data of the at least two elements. Accordingly, the output vector may comprise estimated condition data of the at least two elements of the laser machining head and/or estimated condition data of the laser machining head.

The model trained by machine learning may comprise a plurality of first models for determining condition data of one respective element of the laser machining head, in particular of each of the at least two elements, and a second holistic model which determines a condition or condition data of the laser machining head from the condition data of the elements obtained from the first models. In other words, a first model may be provided for each element in order to determine condition data from one respective element of the laser machining head. Alternatively, a first model may be provided for determining condition data from the at least one element of the laser machining head for each type of element, i.e. for mechanical elements, for electrical elements, or for optical elements. The condition data of the at least one element determined by the at least one first model may determine input data or an input vector for the second model for determining condition data of the laser machining head. The second model may be configured to weight the condition data from a plurality of first models in order to determine the condition data of the laser machining head.

Accordingly, determining the output vector may comprise determining estimated condition data of the at least two elements of the laser machining head by applying corresponding first models to the input vector for each of the at least two elements and determining estimated condition data of the laser machining head by applying the second, holistic model to the estimated condition data of the at least two elements.

The model, or the first model and the second model, may be based on at least one of the following algorithms or a combination thereof: random forest, support vector machine, fuzzy logic, fuzzy decision tree, a decision tree, a neural network, a recurrent neural network, a convolutional neural network, and a deep convolutional neural network. For the deep convolutional neural networks, convolutions separable by layers with residual connections and/or squeeze-and-excitation layers may be used. In all convolutional neural networks, parallel and/or sequential paths may be supplemented by long short term memory (LSTM) structures.

The model may be configured for transfer learning and/or be adaptable for reinforcement learning. For example, the model may be individually trained for an individual laser machining head, i.e. for an existing example of the laser machining head and/or an individual element thereof, i.e. for an existing example of the element. This allows for the respective ML model to be fine-tuned to a given laser machining head or a given element (parameter fine-tuning). The transfer learning may be carried out both in a supervised and an unsupervised manner. Parameter fine-tuning may be performed in combination with reinforcement learning. For example, a very strong temperature increase with disproportionate wear classification by the original model may mean a negative reward and may accordingly encourage re-learning with other parameters.

The method may comprise outputting the output vector to a (human) operator of the laser machining head, e.g. via a user interface. The method may comprise outputting at least one recommendation for action to the user of the laser machining head. The output vector and/or the recommendations for action may be output graphically, for example in the form of pictograms, symbols, text, etc., via a user interface. As a result, the complex relationship between the measurement data and the condition of elements of the laser machining head can be output in a way that is interpretable for an operator. For example, the conditions may be output in the form of a traffic light system. The traffic light colors "red", "yellow", "green" may correspond to the corresponding conditions of the laser machining head or the respective element. Furthermore, an estimate of the dynamic focus shift, i.e. a deviation of the actual focus position of the laser beam from a target focus position, and/or a time indication of the remaining service life of individual elements or of the laser machining head as a whole may be output.

The method may comprise preprocessing the measurement data and/or the process data by means of interpolation and/or smoothing and/or filtering.

According to a further aspect of the present invention, a laser machining system for carrying out a laser machining process is provided, said laser machining system comprising: a laser machining head having at least one sensor unit for acquiring measurement data which is arranged on or in a housing of the laser machining head, and a computing unit configured to determine an input vector based on the acquired measurement data and to determine an output vector containing estimated condition data of the laser machining head and/or at least one element of the laser machining head by applying a model trained by machine learning to the input vector. The laser machining system may further comprise a control. The computing unit may be integrated in the control or provided separately. The laser machining system, in particular a control or the computing unit thereof, may be configured to carry out a method for condition monitoring according to any of the specific embodiments described in this disclosure.

The at least one sensor may be selected from the group containing: a humidity sensor, a temperature sensor, a photodetector, a photodiode, a pressure sensor, a scattered light sensor, an acceleration sensor, a current sensor, a voltage sensor, a distance sensor, a sound sensor, and a vibration sensor.

According to one embodiment, the laser machining head is configured as a laser cutting head, as a laser cladding head or as a laser welding head.

According to one embodiment, the laser machining head comprises at least one or all of the following sensors: a sensor for measuring scattered light from a first protective glass (or a first protective glass package), a sensor for measuring scattered light from a collimating lens (or a collimating lens package), a sensor for measuring a temperature of the collimating lens, a sensor for measuring scattered light in an interior space of the laser machining head, a sensor for measuring humidity in the interior space of the laser machining head, a sensor for measuring scattered light from the focusing lens, a sensor for measuring a temperature of the focusing lens, a sensor for measuring a temperature of a second protective glass (or a second protective glass package), a sensor for measuring scattered light from a third protective glass (or a third protective glass package), a sensor for measuring a temperature of the third protective glass, a sensor for measuring a pressure, in particular a cutting gas pressure, between the second protective glass and the third protective glass, i.e. between the last and the penultimate protective glass (or protective glass package), and a sensor for measuring a cutting gas pressure, in particular between a last protective glass and an exit opening of the laser machining head. The first protective glass (or protective glass package) may be located between a coupling opening for coupling the laser beam into the machining head and the focusing optics. The second protective glass (or protective glass package) may be located between a collimating optics and an exit opening of the laser machining head. The third protective glass (or protective glass package) may be located between the second protective glass (or protective glass package) and an exit opening of the laser machining head. Here, a package denotes a unit of a plurality of optical elements, for example a cassette with two or more protective glasses.

According to one embodiment, the laser machining head comprises at least one or all of the following sensors: a sensor for measuring scattered light from first and second protective glasses (or protective glass packages), a sensor for measuring a temperature of a collimating lens (or collimating lens package), a sensor for measuring a temperature of an interior space of the laser machining head, a sensor for measuring humidity in the interior space, a sensor for measuring a temperature of a focusing lens (or focusing lens package), a sensor for measuring a temperature of fourth and fifth protective glasses (or protective glass packages), a sensor for measuring a pressure, in particular a cutting gas pressure, between the fourth protective glass (or protective glass package) and the fifth protective glass (or protective glass package), and a sensor for measuring a cutting gas pressure, in particular between a last protective glass and an exit opening of the laser machining head. The laser machining head may further comprise a third protective glass or protective glass package. The numbering is according to the order in the laser beam propagation direction.

The laser machining system may comprise additional elements, for example a control or system control for controlling the laser machining system or elements thereof, such as actuators, machines, robots, etc. of the laser machining system, and/or for controlling the laser machining process.

BRIEF DESCRIPTION OF THE DRAWINGS

Embodiments of the invention are described in detail below with reference to figures.

DETAILED DESCRIPTION OF THE EMBODIMENTS

Unless otherwise noted, the same reference numbers are used below for identical elements and elements with the same effect.

Figure 1:
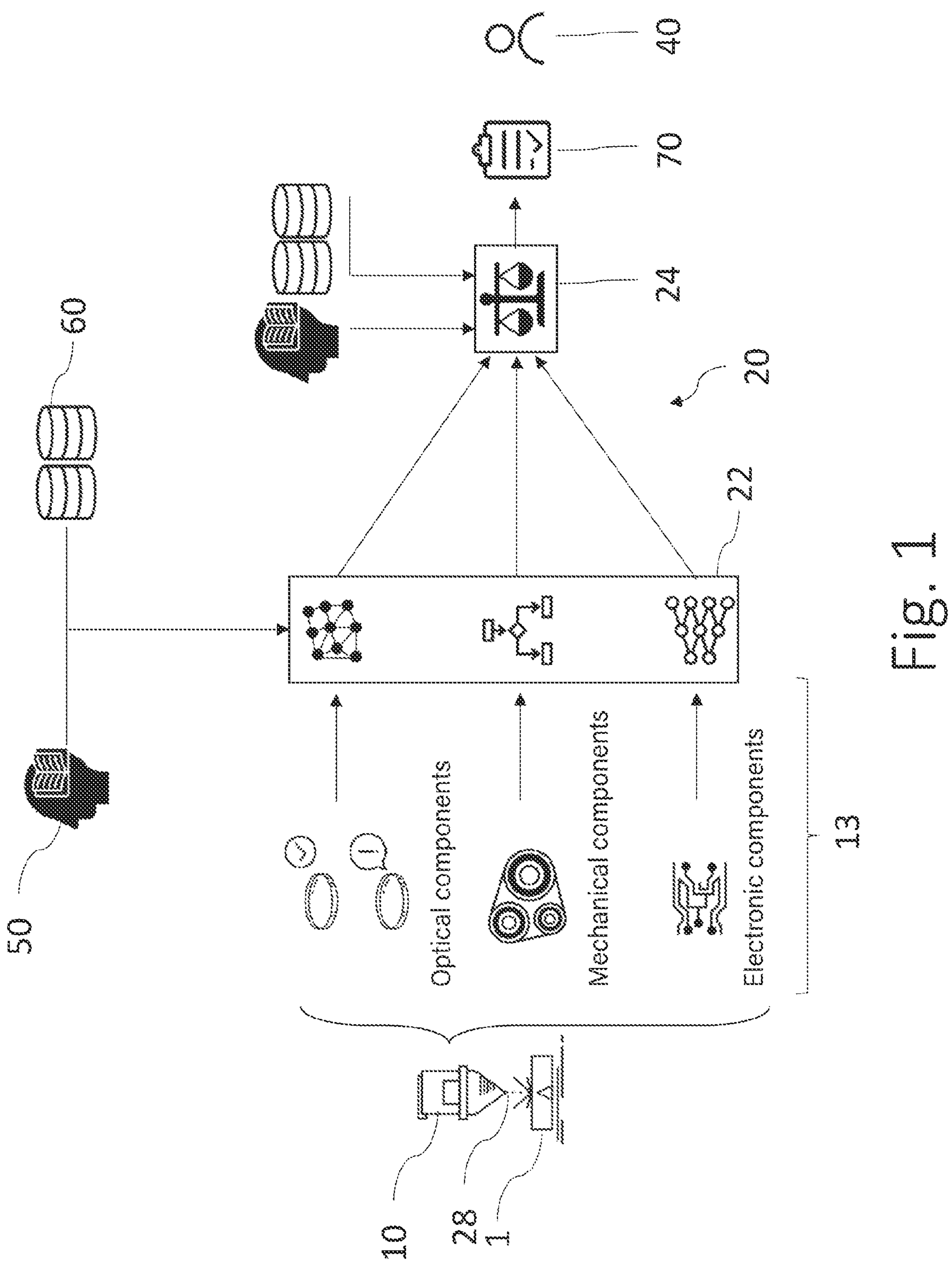
FIG. 1 schematically shows a general concept for better understanding the method for monitoring the condition of a laser machining head according to embodiments of the present invention.

FIG. 1 schematically shows a concept for a better understanding of the method for monitoring the condition of a laser machining head according to embodiments of the present invention.

In a laser machining system for machining a workpiece 1 by means of a laser beam, the laser beam 28 generated by a laser light source, or "laser" for short, 12 (see FIG. 4) is focused or collimated onto the workpiece 1 to be machined with the aid of beam guiding and focusing optics (not shown) in order to heat the workpiece 1 locally up to the melting temperature. Machining may comprise separating workpieces, for example laser cutting, and joining, i.e. permanently connecting, workpieces, in particular laser welding, laser deposition welding or laser soldering. The laser machining system comprises a laser machining head 10 for radiating the laser beam onto the workpiece 1 and may have additional elements, for example a system computer 16 for interaction with an operator, a system control 18 for controlling the laser machining system, or other machines for moving the laser machining head 10 and/or the workpiece 1 (see FIG. 4 or FIG. 7).

The laser machining head, or "machining head" for short, 10 includes a plurality of elements or modules 13, also called "parts" or "components", in particular optical elements, mechanical elements, electrical and/or electronic elements. The laser machining head 10 or the laser machining system may further comprise a computing unit 14 (see FIG. 4) for carrying out methods according to embodiments of the present invention. The computing unit 14 is shown separately from the system control 18 in the figures, but the invention is not limited thereto. For example, the computing unit 14 and the system control 18 may be integrated in one unit.

The optical elements can comprise or be optics, lenses, lens packages, lens groups, mirrors, objectives, protective glasses, collimating lenses, focusing lenses etc. The electronic elements may comprise or be boards, in particular control boards, for example for motor control, and communication boards, adjustable lenses or lens packages. The mechanical elements may comprise or be a drive unit, for example for a lens or lens package adjustable by motor, a motor, a nozzle electrode, a ceramic part, a cutting gas duct, elements for cooling, for example using water or air, of elements or modules, for example an aperture, the housing of the laser machining head 10, or a nozzle etc.

Methods according to embodiments are used to monitor the current, i.e. instantaneous, condition of the laser machining head 10 and/or individual elements 13 thereof. For this purpose, for example during the laser material machining process, measurement data are acquired by means of sensors or sensor units in or on the laser machining head 10. The measurement data include the time profile of various measurement variables and/or individual measurement values of the measurement variables. The measurement variables may include temperatures, pressures, scattered light or scattered light intensity, (air) humidity, acceleration, electrical voltages, electrical currents and digital communication signals from the optical, mechanical, electrical and/or electronic elements.

In addition to the measurement data, further data of the laser machining process, also known as "process data", may be used for condition monitoring. The process data include, for example, time profiles of various process parameters and/or individual values of the process parameters. The process parameters may include laser parameters, machining parameters and/or environmental parameters. The laser parameters may include parameters of a laser source for generating the laser beam, for example a current laser power, a beam parameter product, a pulse peak power, a pulse length, a pulse frequency, a wavelength and/or a fiber diameter. The machining parameters may include, for example, a target focus position of the laser beam 28, a gas pressure, a type of gas (e.g. nitrogen, oxygen, compressed air, etc.), a nozzle type, a nozzle diameter, an imaging ratio of the optical system, a current acceleration of the laser machining head, a feed rate of the laser machining head 10, a distance of the laser machining head 10 from the workpiece 1 to be machined, actuator data of the laser machining head 10 and other machine components. The environmental parameters may include an ambient air temperature and an ambient humidity.

The condition of the laser machining head 10 or individual elements 13 thereof may be specified or described by at least one condition variable. The condition variable may assume a plurality of condition values. The condition values of one or more condition variables form condition data. The condition of the laser machining head 10 or of individual elements 13 thereof may therefore be described or represented by corresponding condition data.

According to embodiments, the measurement data and possibly process data are processed or analyzed by a pretrained machine learning model 20, or "machine learning", "ML" for short, in order to determine the current condition of the laser machining head 10 as a whole, also referred to below as "holistic condition" or "overall condition", and/or to determine the condition of one or more, for example two, elements 13 thereof. These determined conditions are referred to as estimated conditions since the ML model 20 may be used to obtain a prediction or estimate of the conditions. The determined conditions may then be evaluated or classified. Recommendations 70 for measures and actions may be communicated to a human operator 40 based on the determined conditions. The ML model 20 or the holistic ML model 24 may therefore serve to support the decisions regarding repair or maintenance, replacement of elements 13 etc. for the user or operator 40 of the laser machining system or the laser machining head 10.

As shown, the ML model 20 may comprise ML models 22 for each element of the laser machining head 10, also called "element-specific" ML models or first models, and an ML model 24 for the condition of the laser machining head 10, also called "holistic" or "overall" ML model or second model. The ML model 20, the element-specific ML models 22 and/or the holistic ML model 24 may be based, for example, on one of the following algorithms or methods: a neural network, a recurrent neural network, a convolutional neural network, a deep convolutional neural network, random forest, support vector machine, fuzzy logic, a decision tree, or a combination thereof (e.g. fuzzy decision tree). For the deep convolutional neural networks, convolutions separable by layers with residual connections and/or squeeze-and-excitation layers may be used. In all convolutional neural networks, parallel and/or sequential paths may be complemented by long short term memory structures (LSTM).

As shown, the ML models 20-24 may each be configured and trained based on expert knowledge and/or empirical values 50 and/or based on measurement and process data from the past, i.e. the so-called data pool or data basis 60. The data basis 60 may, for example, include information as to which error causes which symptoms in an element of the laser machining head 10. The data pool 60 may in particular include measurement and process data on test or inspection cycles and/or on the conditions of the laser machining head 10 or elements 13, for example optics, which were acquired during their production or development.

Figure 2:
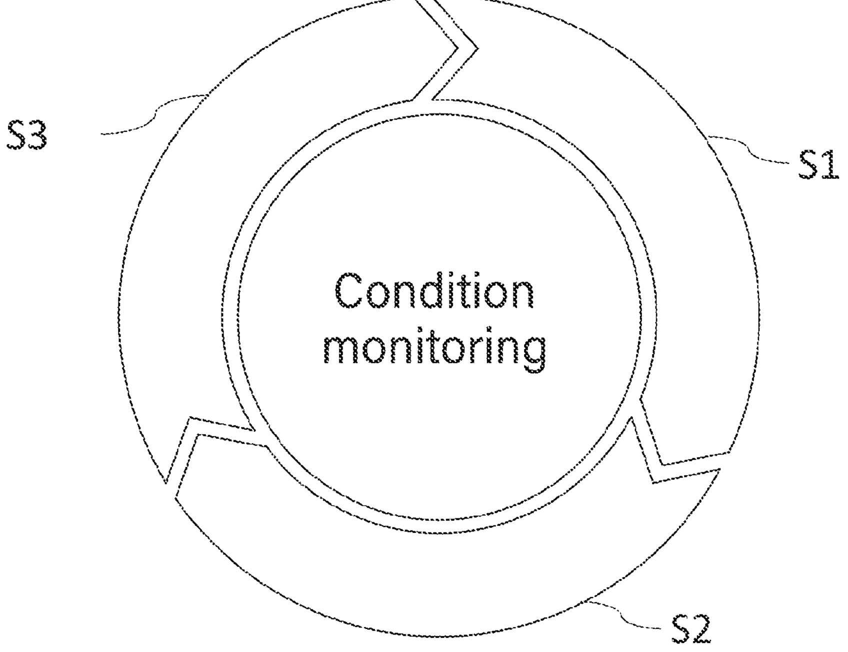
FIG. 2 shows a schematic view of a method for monitoring the condition of a laser machining head according to embodiments of the present invention.

FIG. 2 shows a schematic view of a method for monitoring the condition of a laser machining head according to embodiments of the present invention.

The method comprises the steps of "data acquisition" (S1) and "condition determination" (S2), which may include a condition assessment, and may optionally comprise the step of "deduction of measures" (S3). During a laser machining process, these steps may be performed continuously and repeatedly. The steps may be carried out in parallel to one another, in particular in parallel with respect to time.

Data acquisition comprises acquiring various data. The acquired data include the measurement and process data previously discussed with reference to FIG. 1. As previously discussed, the measurement data may be acquired using appropriate sensors. The process data may also be acquired by means of corresponding sensors, for example for the actual values of the process parameters discussed above. Furthermore, certain process data from other elements of the laser machining system, for example the system control 18, may be transmitted to the computing unit 14. This may be the case, for example, for the target values of the process parameters discussed above.

The sensors for acquiring the measurement data or the process data may, for example, comprise at least one scattered light sensor in order to measure or to monitor the intensity of scattered light from optical surfaces of an optical element 13 of the laser machining head 10 and/or in an (optical) interior space 11 of the laser machining head 10. The measurement data acquired in this way from the at least one scattered light sensor allow conclusions to be drawn about soiling of the optical element or the optical elements 13 of the laser machining head 10. Furthermore, inadmissible optical elements 13 from third-party suppliers, e.g. protective glasses, may be detected if their coating has insufficient properties, for example if the laser beam 28 is scattered or reflected very intensely.

The sensors for acquiring the measurement data or the process data may include at least one temperature sensor. The temperature sensor may be configured to measure the temperature of the laser machining head 10, individual elements 13 thereof and/or the temperature of the environment. For example, a plurality of temperature sensors may be provided to measure or monitor the temperature of individual optical elements 13, the housing of the laser machining head 10, a cooling water temperature, the temperature of an electronic element 13 and/or a nozzle of the laser machining head 10.

Based on a combination of measurement data from temperature sensors and scattered light sensors, a type of soiling or a degree of soiling of optical elements 13 may be estimated or approximately classified according to embodiments of the present invention. Soiling of an optical element 13 by particles is represented, for example, by an increased scattered light intensity, while the temperature of the optical element 13 remains approximately constant. Other types of soiling, for example smoke residue on the optical surfaces, are represented by an increased temperature value while the scattered light value remains approximately constant. Accordingly, an increased temperature (at a constant scattered light intensity) may, for example, be assessed to be more critical than an increased scattered light intensity (at a constant temperature) since an increased temperature has a direct influence on an unwanted deviation of the actual focus position from the target focus position of the laser beam, also called "focus shift", and may therefore have an effect on the process result of the laser machining process.

Temperature sensors on and/or in the vicinity of electrical or electronic elements 13, for example communication and control boards, within the housing 15 of the laser machining head 10 may be used to monitor for early overheating and the associated unplanned failure of these elements 13. For example, failure due to overheating of communication boards may result in commands from external elements or components not arriving at the laser machining head 10. In addition, the operator 40 or a control of the laser machining process no longer receives detailed information about the condition of the laser machining head 10 as a result. The error responsible for the laser machining head 10 no longer working is therefore not traceable. Non-functioning or incorrectly functioning control boards, for example for a motor, may lead to them no longer being able to move to intended or specified positions. The focus position of the laser beam 28 can therefore no longer be adjusted.

Furthermore, at least one pressure sensor may be used to monitor a gas pressure and/or an ambient pressure. A pressure sensor may, for example, acquire or monitor the cutting gas pressure within the cutting gas duct of a laser cutting head. When the cutting gas pressure fluctuates to a certain extent during the process, it may no longer be possible to guarantee the desired process result.

Furthermore, at least one acceleration sensor may be provided. The time profile of the sensor values acquired by the acceleration sensor may be directly related to the load on a motor, for example, which moves an optical element 13, for example a focusing lens or collimating lens, within the laser machining head 10. On the basis of empirical values over the lifetime of motors, an assessment of the wear and tear or degradation of the motor may be made. With the help of the method according to embodiments of the present invention, a failure of the motor may therefore be predicted and corresponding measures may be initiated.

Changes in the power consumption of various electrical or electronic elements 13, for example boards, may be determined by means of current sensors. This allows for conclusions to be drawn about functional defects in electrical components on the boards.

Air-borne sound sensors and structure-borne sound sensors may detect acoustic machine and process emissions in order to determine wear and tear on elements 13 of the laser machining head 10. For example, an increase in vibrations at certain frequency bands on the motor indicates wear or an acute operating fault which, if left untreated, will lead to an unplanned total failure.

Furthermore, at least one humidity sensor for measuring (air) humidity inside the housing of the laser machining head and/or in an area surrounding the laser machining head may be provided. In combination with a measured cooling water temperature, condensation on the optical surfaces of optical elements 13 and thus failure of the laser machining head 10 can be predicted or avoided.

Sensors for detecting RFIDs, photodiodes and/or sensors for detecting or reading a mechanical coding or the use of coded elements 13 of the laser machining head 10, for example optical elements, ceramic parts or a nozzle electrode, may be provided in order to detect or avoid the use of elements from third parties and thus improper operation of the laser machining head 10.

Furthermore, position sensors may be provided, for example for detecting a z-position (i.e. the position with respect to an optical axis of the laser machining head 10) of a collimation lens. In combination with the drive instruction for the lens position when the focus position of the laser beam 28 is set by the operator 40, it may be determined, for example, whether there is a problem with a motor for adjusting the collimation lens. For example, when the tape of a tape motor breaks, no change in the z-position is detected and the position sensor only outputs a lower z-position of the focusing lens.

Furthermore, distance sensors, for example capacitive distance sensors and/or optical distance sensors, for example based on OCT (optical coherence tomography), may be provided. In this way, for example, a distance of the laser machining head 10 from the workpiece 1 or a collision of the laser machining head 10 with the workpiece 1 may be sensed or detected.

These relationships described may be included in the previously discussed expert knowledge 50 and may be used for training the ML models 20-24 and consequently also for condition determination.

The condition determination may comprise determining the condition of individual elements 13 and/or modules of the laser machining head 10 using the element-specific ML models 22. Based thereon, the condition of the laser machining head 10 as a whole may be determined or estimated with the aid of the holistic model 24, for example whether the laser machining head is still operational or in the desired operating condition or not. The conditions of the individual elements 13 may be used with different weightings to determine and to assess the overall condition of the laser machining head 10. Accordingly, the condition of the laser machining head 10 may be based on at least one condition of an element 13 or on a combination of the conditions of a plurality of elements 13, for example two. The condition of the laser machining head 10 may directly influence the process result, in particular a process quality and/or process efficiency.

Accordingly, determining the condition of the laser machining head 10 or determining an output vector as described below may comprise determining estimated condition data of individual elements 13 of the laser machining head 10 by applying corresponding first models 22 for the individual elements 13 to the measurement or process data and determining estimated condition data of the laser machining head 10 by applying the second, holistic model 24 to the estimated condition data of the individual elements 13.

As previously discussed with reference to FIG. 1, the condition of the laser machining head 10 or the condition of one or more, for example two, elements 13 may each be specified or described by means of one or more condition variables. Each of the condition variables may assume different values. The values of one or more condition variables form corresponding condition data for the condition of the laser machining head 10 or the individual elements 13. The respective condition variables may be output as condition data by the corresponding element-specific ML models 22 or the holistic ML model 24. Each of the condition variables may assume different values. The condition of the laser machining head 10 or individual elements 13 thereof may therefore be described or represented by the corresponding condition data.

With the help of the determined condition of the laser machining head 10, a statement as to whether the laser machining head 10 is still operational can thus be made. This may correspond, for example, to an intended or desired operating condition of the laser machining head 10, which may be a target condition of the laser machining head. Accordingly, a condition variable may have a first value or be in a first range. Furthermore, it may be determined whether the laser machining head 10 is no longer operational. Accordingly, the condition variable may have a second value or be in a second range. In addition, a critical range for the condition before the condition changes from the desired operating condition to the condition in which the laser machining head 10 is no longer operational may be specified. This critical range of the condition may correspond to a third value or a third range of the condition variable. This consideration of the determined condition may also be referred to as condition assessment. A corresponding condition assessment may also be carried out for individual elements 13 of the laser machining head 10.

The deduction of measures may include outputting appropriate error messages and/or information messages to the operator 40. These messages may contain, for example, the condition of the laser machining head 10 or the elements 13, the causes (e.g. "protective glass soiled") and/or recommendations for action or measures (e.g. "change protective glass"). The measures may also include an automatic or automated intervention, for example an intervention in the laser machining process, for example the control of corresponding process parameters or an automatic nozzle change. The measures may be used to restore the target condition. Based on the determined condition of the laser machining head 10 and/or on the condition of one or more, for example two, elements 13, the laser machining process may also be controlled in order to ensure a desired machining result.

Causes for the deviation from the target condition, any effects on the laser machining process or head and possible measures are listed in Table 1 as an example:

TABLE 1

| Cause(s)/Effect(s): | Measure(s): |
| --- | --- |
| Optical elements: | |
| Soiling of an optical surface/an optical element | Replacing the element, contacting the service |
| Use of optical elements, such as optics, from a third party: This may lead to damage to the laser machining head due to excessive laser reflections on optical coatings. | Stopping the laser machining process and outputting information to the operator |
| Laser power exceeds the maximum permissible power: There is a risk of damage to optical elements or the laser machining head. | Stopping the laser machining process and outputting information to the operator |

TABLE 1-continued

| Cause(s)/Effect(s): | Measure(s): |
|---|---|
| Electrical or electronic elements: | |
| Electronic elements, such as control and/or communication boards, are too hot. | Stopping the current laser machining process and cooling down the laser machining head, changing the electronic elements if necessary |
| Mechanical components, e.g. motors, worn out | Temporary further use, planning replacement measures, contacting service |
| Motor band broken | Stopping the laser machining process, initiating replacement/repair measures, contacting service |
| High currents in electronic elements, sensor or communication boards | temporary further use or stopping the laser machining process and initiating replacement/repair measures, contacting service |
| Mechanical elements: | |
| Ceramics defective | Changing ceramics |
| Nozzle damaged | Changing nozzle |
| Nozzle too hot, for example because a focus position of the laser beam and/or an imaging ratio is in an impermissible range | Changing the focus position and/or imaging ratio |
| Ambient humidity and/or humidity in head too high | Adjusting cooling water temperature |
| Cooling water flow too low | Informing the operator |
| Drive unit of a motor-driven adjustable lens is defective, for example due to a tape break | Stopping the laser machining process, initiating replacement/repair measures, contacting service |
| Pressure drop in a cutting gas duct, for example due to a broken cable | Checking the cutting gas duct |
| Increase in pressure between two optical elements due to a leak | Stopping the laser machining process, initiating replacement/repair measures, contacting service |

FIGS. 3*a* to 3*d* show schematic views of sensors for methods for monitoring the condition of a laser machining head according to embodiments of the present invention.

FIGS. 3*a* to 3*d* each show a schematic cross-sectional view of different embodiments for the number and arrangement of the sensors used on or in the laser machining head shown in FIG. 1. The sensors allow for measurement data to be acquired, in particular of temperature, scattered light, pressure, in particular cutting gas pressure, and humidity.

FIGS. 3*a* to 3*d* each show the laser machining head 10 with an optical interior space 11 delimited by a housing 15, a collimating lens, lens package or lens group 34 for collimating a laser beam 28 and a focusing lens, lens package or lens group 36 for focusing the laser beam 28 onto a workpiece 1 (not shown). The elements 34 and 36 are each arranged in the interior space 11 of the laser machining head 10. The laser machining head 10 further comprises at least one protective glass or protective glass package at an entry opening for the laser beam 28 into laser machining head 10 and at least one protective glass or protective glass package at an exit opening for the laser beam 28 from the laser machining head 10.

Figure 3A:
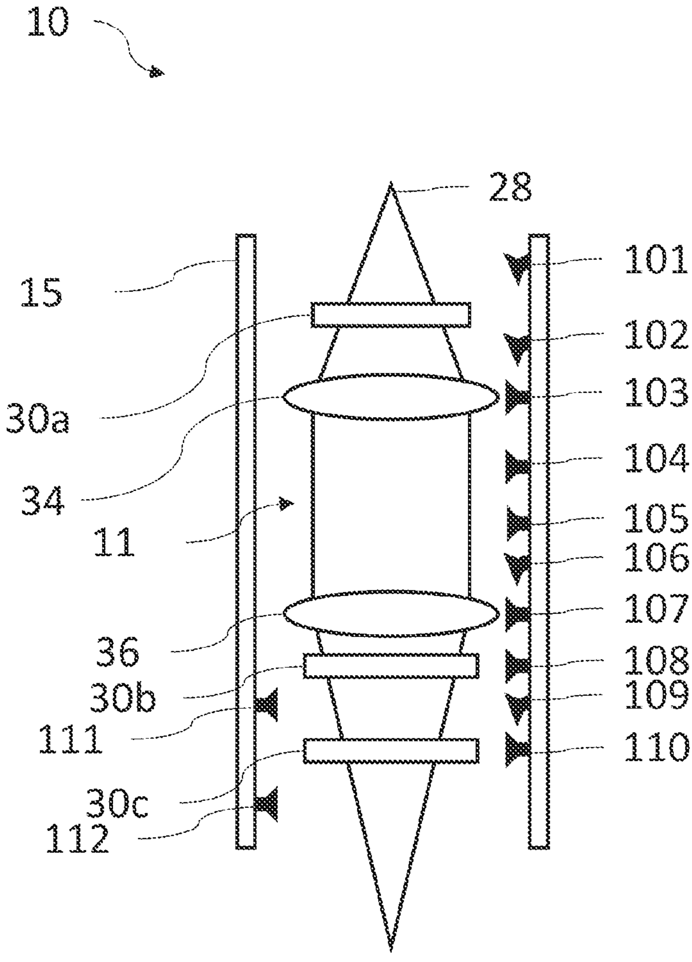
FIGS. 3*a* to 3*d* show schematic cross-sectional views of a laser machining head and sensors for methods of condition monitoring according to embodiments of the present invention.

FIG. 3*a* shows a laser machining head 10, which is configured as a laser cutting head, and also shows a sensor 101 for measuring scattered light of a first protective glass or protective glass package 30*a*, a sensor 102 for measuring scattered light from the collimating lens or collimating lens package 34, a sensor 103 for measuring a temperature of the collimating lens or collimating lens package 34, a sensor 104 for measuring scattered light in the interior space 11 of the laser machining head 10, a sensor 105 for measuring humidity in the interior space 11 of the laser machining head 10, a sensor 106 for measuring scattered light from the focusing lens or focusing lens package 36, a sensor 107 for measuring a temperature of the focusing lens or focusing lens package 36, a sensor 108 for measuring a temperature of a second protective glass or protective glass package 30*b*, a sensor 109 for measuring scattered light from a third protective glass or protective glass package 30*c*, a sensor 110 for measuring a temperature of the third protective glass or protective glass package 30*c*, a sensor 111 for measuring a pressure, in particular a cutting gas pressure, between the second protective glass or protective glass package 30*b* and the third protective glass or protective glass package 30*c*, and a sensor 112 for measuring a cutting gas pressure between the last (here: third) protective glass or protective glass package 30*c* and the exit opening of the laser machining head 10. As shown, the first protective glass or protective glass pack 30*a* is arranged at the entry opening and the second and third protective glasses or protective glass packages 30*b*, 30*c* are arranged at the exit opening.

Figure 3B:
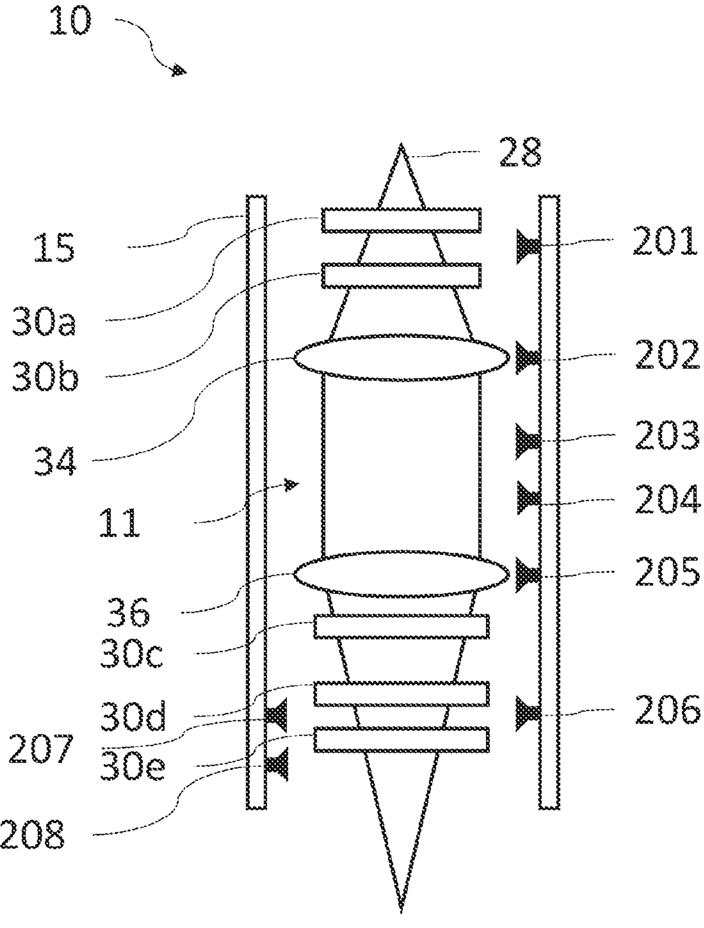

FIG. 3*b* shows a laser machining head 10, which is configured as a laser cutting head, and also shows a sensor 201 for measuring scattered light from a first protective glass or protective glass package 30*a* and a second protective glass or protective glass package 30*b*, a sensor 202 for measuring a temperature of the collimating lens or collimating lens package 34 , a sensor 203 for measuring a temperature of the interior space 11, a sensor 204 for measuring a humidity of the interior space 11, a sensor 205 for measuring a temperature of the focusing lens or focusing lens package 36, a sensor 206 for measuring a temperature of a fourth protective glass or protective glass pack 30*d* and a fifth protective glass or protective glass package 30*e*, a sensor 207 for measuring a pressure, in particular a cutting gas pressure, between the fourth protective glass or protective glass package 30*d* and the fifth protective glass or protective glass package 30*e*, and a sensor 208 for measuring a cutting gas pressure between the last (here: fifth) protective glass or protective glass package 30*e* and the exit opening of the laser machining head 10. FIG. 3*b* also shows a third protective glass 30*c*. As shown, the first and second protective glasses or protective glass packages 30*a*, 30*b* are arranged at the entry opening and the third through fifth protective glasses or protective glass packages 30*c*, 30*d*, 30*e* are arranged at the exit opening.

Figure 3C:
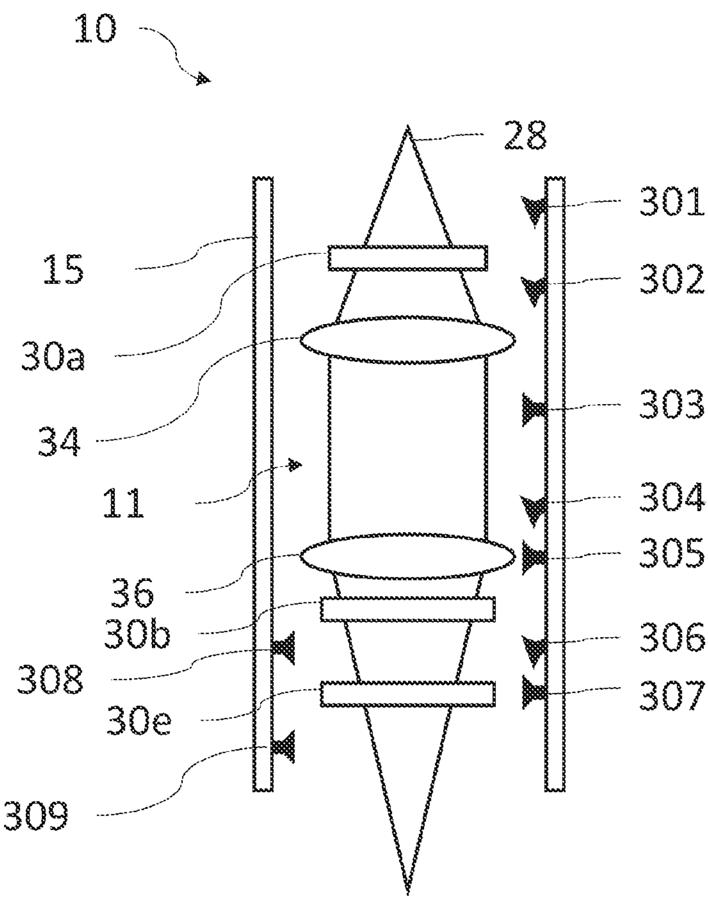

FIG. 3*c* shows a laser machining head 10, which is configured as a laser cutting head, and also shows a sensor 301 for measuring scattered light from a first protective glass or protective glass package 30*a*, a sensor 302 for measuring scattered light from the collimating lens or collimating lens package 34, a sensor 303 for measuring scattered light in the interior space 11, a sensor 304 for measuring scattered light from the focusing lens or focusing lens pack 36, a sensor 305 for measuring a temperature of the focusing lens or focusing lens pack 36, a sensor 306 for measuring scattered light from a third protective glass or protective glass pack 30*c*, a sensor 307 for measuring a temperature of the third protective glass or protective glass package 30*c*, a sensor 308 for measuring a pressure, in particular a cutting gas pressure, between the third protective glass or protective glass package 30*c* and a second protective glass or protective glass package 30*b* and a sensor 309 for measuring a cutting gas pressure between the last (here: fifth) protective glass or protective glass package 30*e* and the exit opening of the laser machining head 10. As shown, the first protective glass or protective glass package 30*a* is arranged at the entry opening and the second and third protective glass or protective glass package 30*b*, 30*c* is arranged at the exit opening.

Figure 3D:
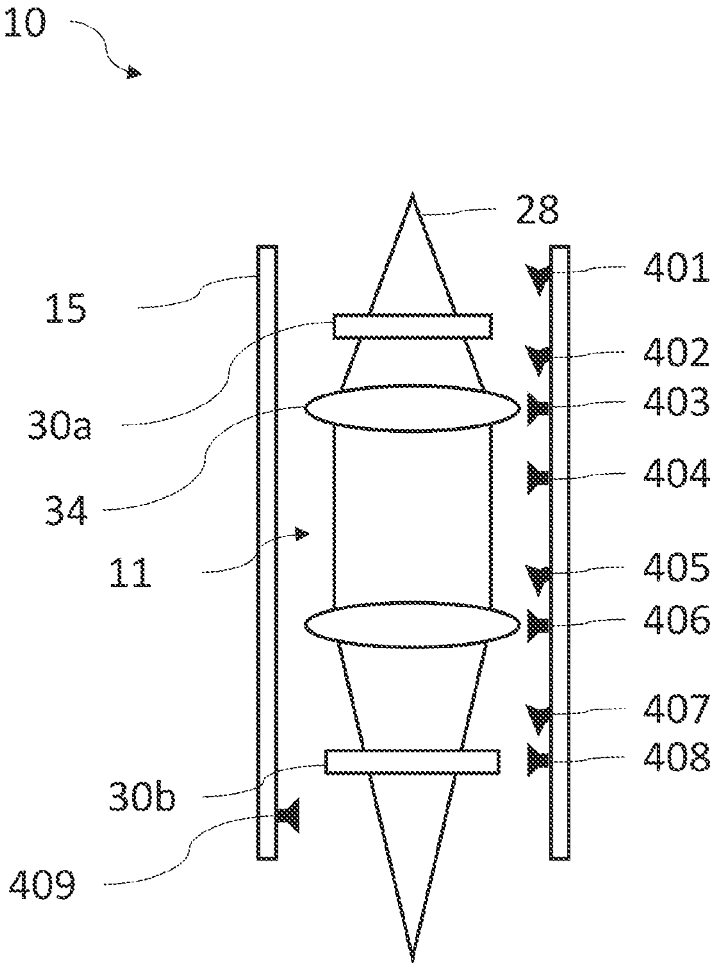

FIG. 3*d* shows a laser machining head 10, which is configured as a laser cutting head, and also shows a sensor 401 for measuring scattered light from a first protective glass or protective glass package 30*a*, a sensor 402 for measuring scattered light from the collimating lens or collimating lens package 34, a sensor 403 for measuring a temperature of the collimating lens or collimating lens pack 34, a sensor 404 for measuring scattered light in the interior space 11, a sensor 405 for measuring scattered light from the focusing lens or focusing lens pack 36, a sensor 406 for measuring a temperature of the focusing lens or focusing lens pack 36, a sensor 407 for measuring scattered light from a second protective glass or protective glass package 30*b*, a sensor 408 for measuring a temperature of the second protective glass or protective glass package 30*b*, and a sensor 409 for measuring a cutting gas pressure between the last (here: second) protective glass or protective glass package 30*b* and the exit opening of the laser machining line header 10. As shown, the first protective glass or protective glass pack 30*a* is positioned at the entry opening and the second protective glass or protective glass pack 30*b* is positioned at the exit opening.

Figure 4:
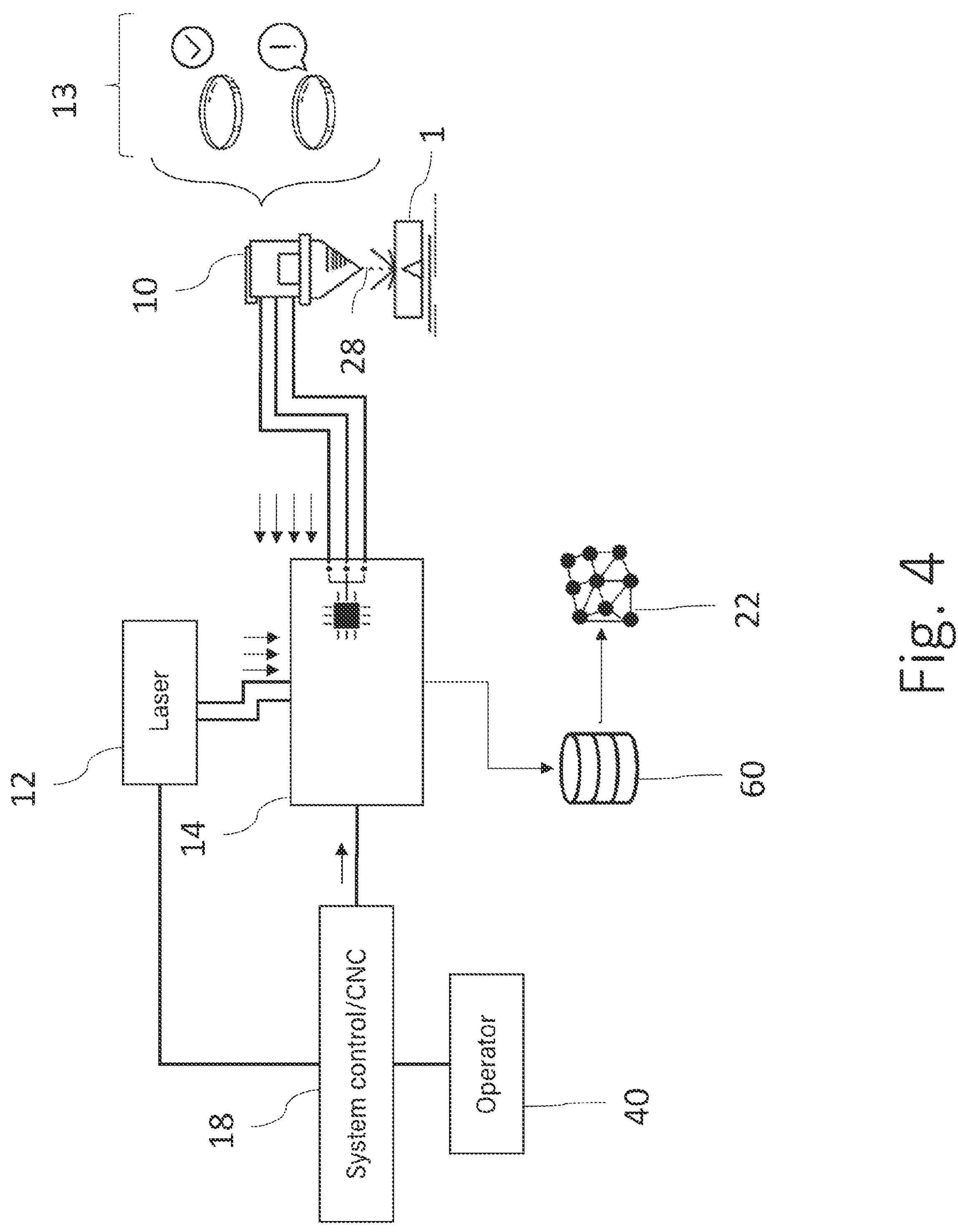
FIG. 4 schematically shows a concept for a better understanding of a method for training an ML model for methods for monitoring the condition of a laser machining head according to embodiments of the present invention.

FIG. 4 schematically shows a concept for better understanding of a method for training an ML model for methods for monitoring the condition of a laser machining head according to embodiments of the present invention.

The training of the ML models 20-24 shown in FIG. 1 may be carried out for a respective configuration of a laser machining head 10 with a wide data pool 60. A configuration of a laser machining head 10 may in particular specify or define the respective optical, mechanical and electrical/electronic elements 13 used in the laser machining head 10. Thus, for each configuration of a laser machining head 10, the ML models 20-24 may be trained accordingly.

In order to record or obtain the data basis 60 discussed with reference to FIG. 1, corresponding reference or training data are acquired for as many test scenarios as possible, for example. The test scenarios include, for example, the use of clean and dirty optical elements 13, or mechanical or electronic elements 13 that have been used over a long period of time in a large number of laser machining processes and are therefore worn or aged. The reference data include measurement data and/or process data as well as corresponding predetermined values of the condition variables for indicating the condition of the laser machining head 10 or individual elements 13. The measurement data may be transmitted from sensors arranged on or in the laser machining head 10 to the computing unit 14. The process data may be transmitted to the machining unit 14 from the laser source 12, the system control 18 and, if necessary, further elements of the laser machining system. The sensor data and the process data may be recorded by the computing unit 14 for the respective test scenarios and may thus be used as a data basis 60 for training the ML models 20-24.

The data basis 60 also includes corresponding values of the condition variables that describe the condition of the laser machining head 10 or individual elements 13. These are specified for each test scenario and also recorded by the computing unit 14 as part of the data basis 60.

The data basis 60 may be individually re-optimized for each copy of the laser machining head 10 with a predetermined configuration during its manufacture using predefined test cycles in order to achieve more precise statements of the ML models 20-24 in later use (parameter fine-tuning).

In addition, expert knowledge from the development and production phase and the service phase may also be used for training or fine-tuning parameters. For example, realistic temperature value ranges for lens temperatures, so-called "constraints", or knowledge of error symptoms (motor was driven, but the z-axis position showed no change) may be included. The ML models 20-24 may be optimized for the special field of training and application. The particular algorithm of the ML model may be chosen depending on the type of the underlying data.

For example, a neural network algorithm may be used for a large data set with floating-point sensor values that depicts a complex interplay of physical interactions. This is preferred, for example, when considering temperature profiles or scattered light profiles of optical elements or in the case of acceleration and sound sensors in mechanical elements.

A random forest or SVM algorithm may be used for a smaller data set with floating-point sensor values that depicts a complex interplay of physical interactions. This is preferred, for example, when considering only optical elements, in particular when considering temperature profiles or scattered light profiles of optical elements.

In the case of small amounts of data with a large number of logical dependencies and rules based on expert knowledge, preferably decision trees may be used.

FIG. 4 shows an example of the training of an element-specific ML model 22 for determining a condition of an optical element 13, for example a protective glass, in particular protective glass close to a machining area of the laser machining process or the last protective glass. In order to generate different error characteristics and thus different test scenarios, optical elements in different conditions are inserted into the laser machining head and measurement and process data and condition data for specifying or qualifying the condition of the individual elements are acquired or recorded. The different conditions may include a good condition, for example a clean optical protective glass, and faulty or deteriorated conditions, for example an aged and/or dirty protective glass. The condition data for specifying the condition of the optical element may include measured values of soiling of the optical element, for example via optical particle measurements, and/or subjective information, for example by means of a visual assessment of cleanliness ("good", "average", "poor") .

Figure 5:
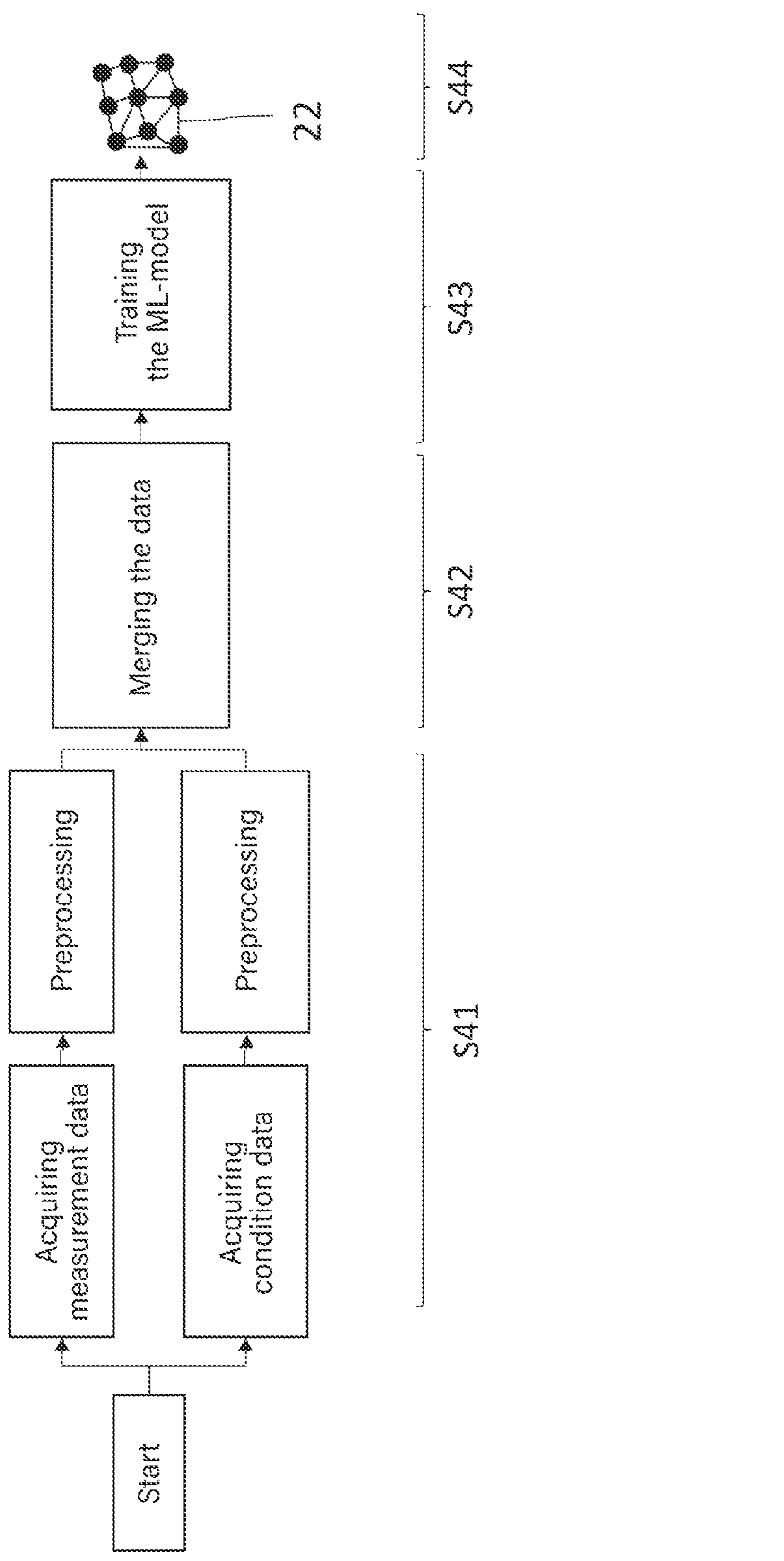
FIG. 5 shows a flow chart of a method for training an ML model for methods for monitoring the condition of a laser machining head according to embodiments of the present invention.

FIG. 5 shows a flow chart of a method for training an ML model for methods for monitoring the condition of a laser machining head according to embodiments of the present invention using the example of an element-specific ML model 22 for an optical element 13 (cf. FIG. 4).

The data basis 60 used for training the ML models 20-22 includes recording the measurement data, for example acquiring temperature values of an optical element and/or acquiring a scattered light intensity of the optical element, for example by means of photodiodes, and acquiring corresponding condition data (S41) of the optical element. The condition data include, for example, one or more snapshots of the deviation of the dynamic focus position from the target focus position or focus shift based on thermal effects and/or the deformation of the optical element and/or the degree of soiling of the optical element measured by optical particle measurements and/or subjectively perceived. The acquired measurement data and the acquired condition data are then preprocessed in preparation for merging (S42). For example, outlier values are removed from the data and/or curves are smoothed. Furthermore, the respective data may be interpolated in order to synchronize corresponding measurement times.

Subsequently, the measurement data and the condition data are merged (S42). In this case, individual and/or a plurality of temporally dependent and/or independent measurement values may be assigned to the respective condition values.

Tables 2a and 2b show an example of a tabular representation of the measurement data and condition data after merging. Each measurement value vector is thus assigned a corresponding quality measure vector (row representation in Table 2a) or are a time profile of measurement value vectors is assigned a superordinate quality measure vector (row representation in Table 2b).

Table 2a shows a merging in which temporally independent measurement values of the measurement variables 1 to n were each assigned a value of a state variable 1 to m. In Table 2a, measurement variable 1 corresponds, for example, to an intensity of scattered light on a protective glass, measurement variable 2 to a temperature on a protective glass, and measurement variable 3 to the temperature on a focusing lens. Condition variable 1 corresponds, for example, to a focus shift in mm and condition variable 2 corresponds, for example, to a subjective assessment of the cleanliness of the protective glass ("good", "average", "poor").

TABLE 2a

| Time (in s) | Measurement variable 1 | Measurement variable 2 | Measurement variable 3 | • | Measurement variable n | Condition variable 1 | Condition variable 2 | • | Condition variable m |
|---|---|---|---|---|---|---|---|---|---|
| 0.1 | 10.1% | 25° C. | 24.3° C. | [ | | 0.12 | good | [ | |
| 0.2 | 9.8% | 25° C. | 24.2° C. | [ | | 0.15 | good | [ | |
| 0.3 | 10.2% | 25° C. | 24.2° C. | [ | | 0.13 | good | [ | |
| 0.4 | 10.6% | 25.1° C. | 24.3° C. | [ | | 0.13 | good | [ | |
| 0.5 | 11.0% | 25.2° C. | 24.4° C. | [ | | 0.14 | good | [ | |
| . . . | | | | [ | | | | [ | |
| 180.0 | 14.1% | 53° C. | 45.1° C. | [ | | 1.3 | average | [ | |
| 180.5 | 13.8% | 53.1° C. | 45.1° C. | [ | | 1.31 | average | [ | |
| 181.0 | 13.9% | 53.2° C. | 45.3° C. | [ | | 1.45 | average | [ | |
| 181.5 | 14.0% | 54° C. | 45.6° C. | [ | | 1.52 | poor | [ | |
| 182.0 | 13.8% | 54.1° C. | 45.7° C. | | | 1.61 | poor | [ | |

Table 2b shows a merging in which temporally dependent measurement values of the measurement variables 1 to n were each assigned a value of a condition variable 1 to m. The measurement variables 1 to n and the condition variables 1 to m correspond to the measurement and condition variables from Table 2a.

TABLE 2b

| Time (in s) | Measurement variable 1 | Measurement variable 2 | Measurement variable 3 | • | Measurement variable n | Condition variable 1 | Condition variable 2 | • | Condition variable m |
|---|---|---|---|---|---|---|---|---|---|
| 0.1 | 10.1% | 25° C. | 24.3° C. | | | | | | |
| 0.2 | 9.8% | 25° C. | 24.2° C. | | | | | | |
| 0.3 | 10.2% | 25° C. | 24.2° C. | | | 0.14 | good | | |
| 0.4 | 10.6% | 25.1° C. | 24.3° C. | | | | | | |
| 0.5 | 11.0% | 25.2° C. | 24.4° C. | | | | | | |
| . . . | . . . | . . . | . . . | . . . | . . . | . . . | . . . | . . . | . . . |
| 180.0 | 14.1% | 53° C. | 45.1° C. | [• | | | | [• | |
| 180.5 | 13.8% | 53.1° C. | 45.1° C. | [• | | | | [• | |
| 181.0 | 13.9% | 53.2° C. | 45.3° C. | [• | | 1.47 | average | [• | |
| 181.5 | 14.0% | 54° C. | 45.6° C. | [• | | | | [• | |
| 182.0 | 13.8% | 54.1° C. | 45.7° C. | [• | | | | [• | |

The measurement values of the measurement variables 1 to n may be merged to a measurement data vector and the condition values of the condition variables 1 to m may be merged to a condition data vector. A corresponding condition data vector may thus be assigned to each measurement data vector. For example, in Table 2a, each measurement data vector that corresponds to a row with a plurality of temporally independent measurement values of different measurement variables may be assigned a corresponding condition data vector with values of the two condition variables 1 and 2, or in Table 2b one or more measurement data vectors that corresponds to a plurality of rows with a time profile of different measurement variables may be assigned a corresponding condition data vector with values of the two condition variables 1 and 2.

The data basis 60 is used for regression or classification for the training (S43) of the ML model. The data basis includes the set of all measurement data vectors as input variables, i.e. the acquired time profiles of the respective measurement variables, as input vector or features and the set of all condition data vectors as output vector, or as assigned target variables for training the respective algorithm of the ML model. The set of all measurement value vectors recorded consecutively in time is transferred to the ML model as features and the set of condition vectors as assigned target variables, e.g. for regression or classification. At the end of the training the resulting ML model is provided (S43).

Figure 6:
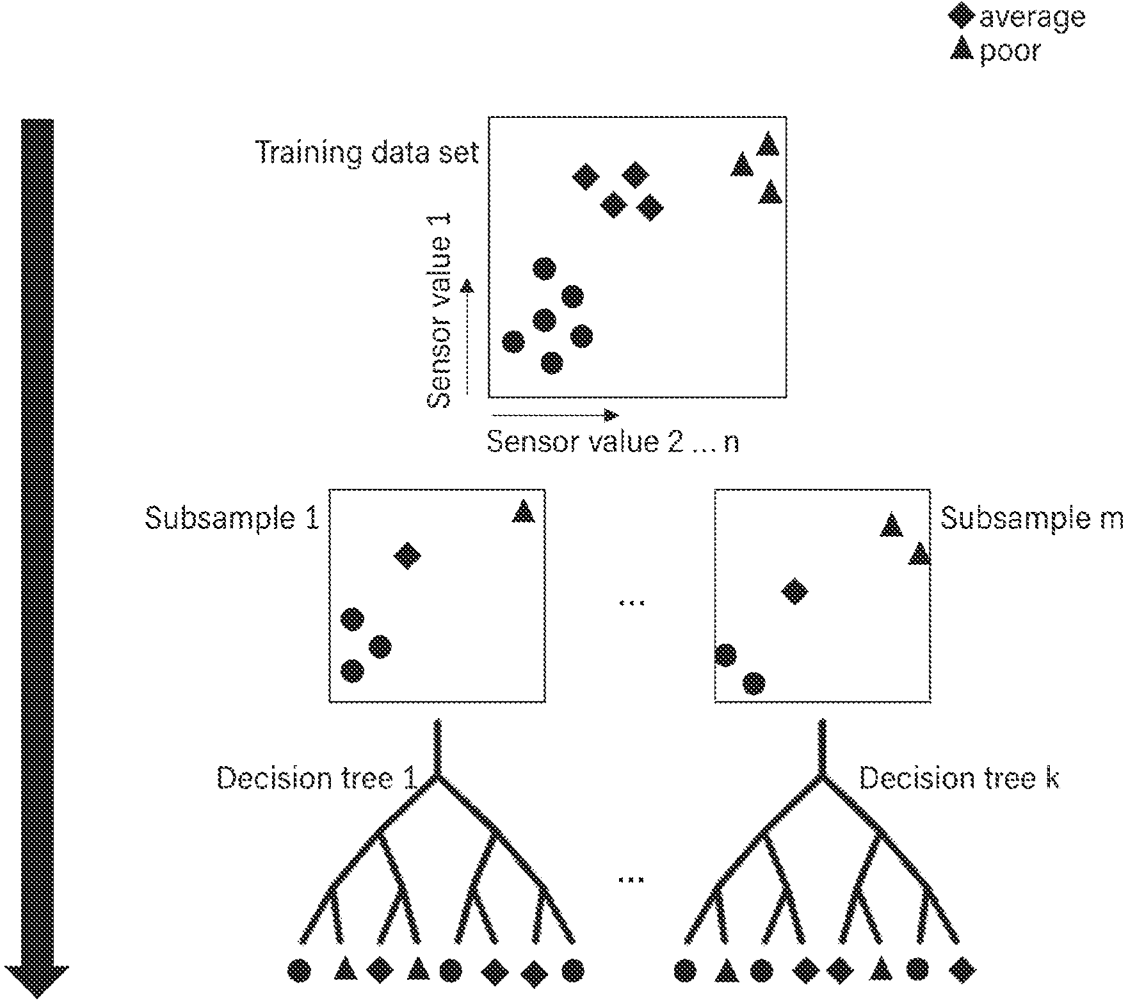
FIG. 6 schematically shows an exemplary sequence for training an ML model for methods for monitoring the condition of a laser machining head according to embodiments of the present invention.

FIG. 6 schematically shows an exemplary sequence for training an ML model for methods for monitoring the measurement condition of a laser machining head according to embodiments of the present invention. FIG. 6 shows step S43 from FIG. 5 in detail.

The training (S43) is explained using the example of a classification and the random forest algorithm for creating the ML model for the condition value 2 "cleanliness of the protective glass" listed in Tables 2a and 2b. According to embodiments of the present invention, alternative algorithms, for example neural networks or support vector machines, or a combination of a plurality of algorithms may be used depending on the requirements, for example accuracy, available computing power, decision between classification or regression task, data basis etc.

For the random forest algorithm, subsamples 1 to m that are each used to train an individual decision tree 1 to k are formed from the n-dimensional sensor value space. The leaves of the decision tree correspond to the classification (here: good, average, bad), i.e. a corresponding condition value of the condition variable. The entirety of the k decision trees corresponds to the ML model.

Figure 7:
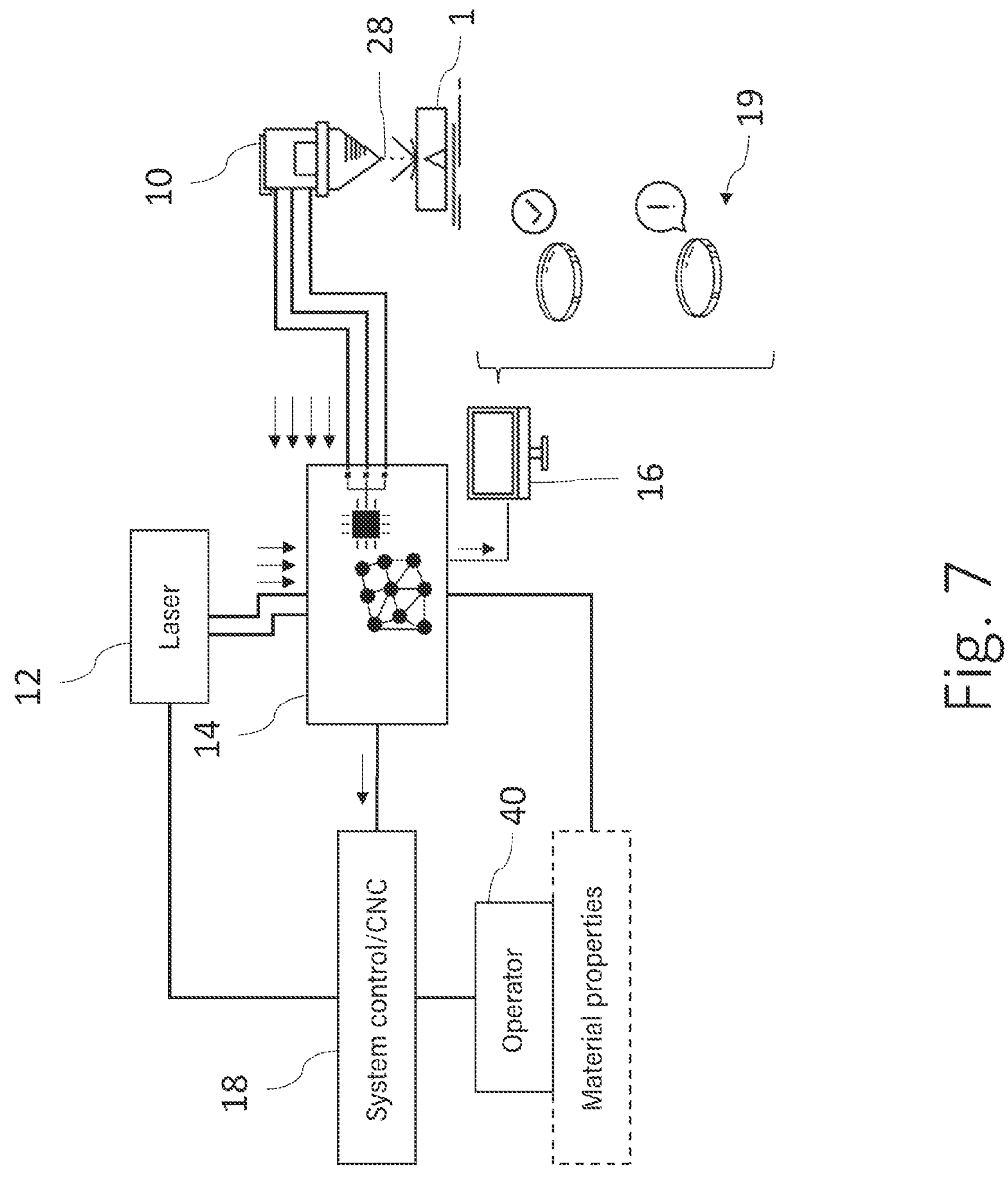
FIG. 7 schematically shows a concept for a better understanding of the method for monitoring and representing the condition of a laser machining head according to embodiments of the present invention.
Figure 8A:
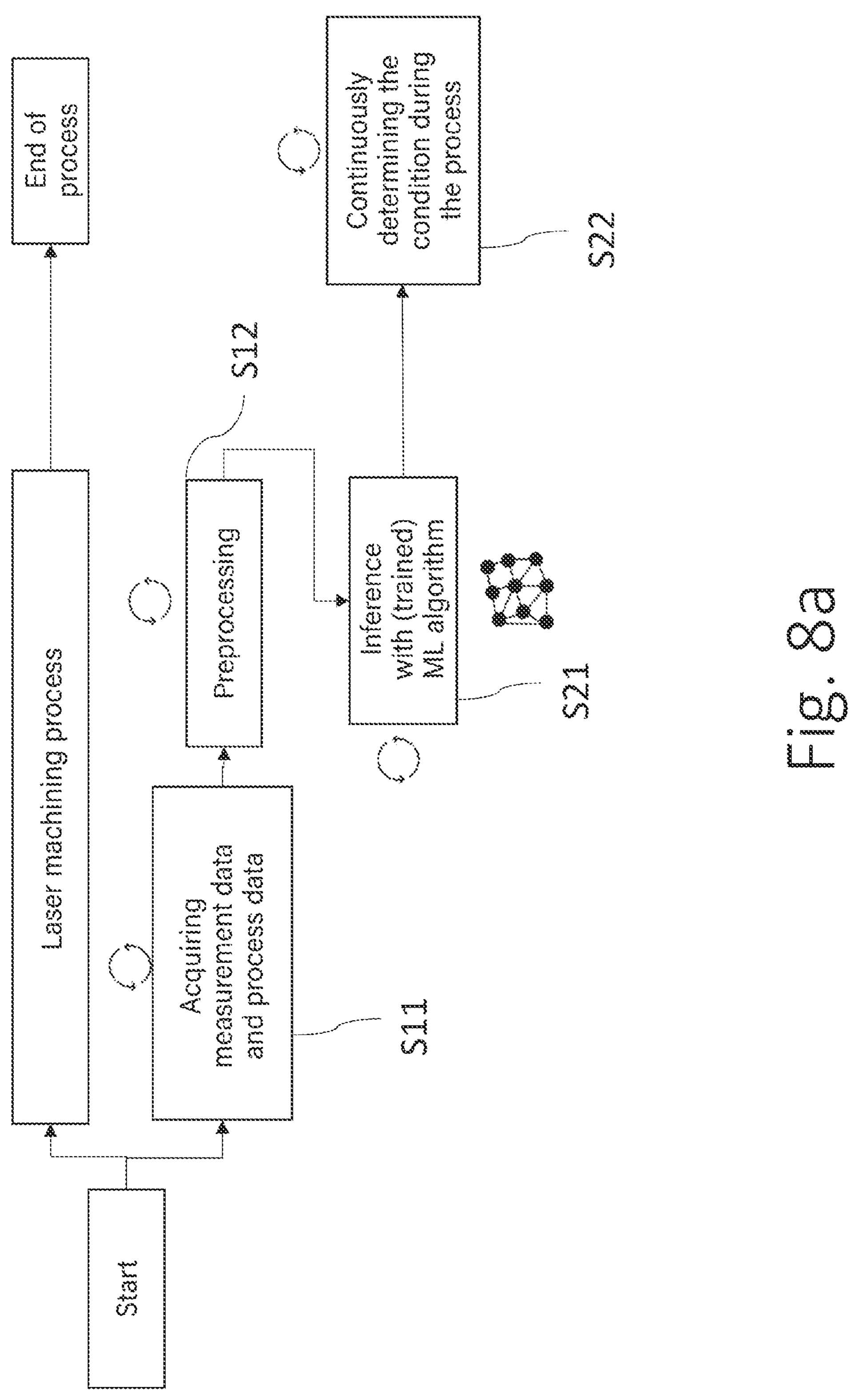
FIG. 8*a* schematically shows the sequence of a method for monitoring the condition of a laser machining head according to embodiments of the present invention.

FIG. 7 schematically shows a concept for better understanding of the method for monitoring the condition of a laser machining head according to embodiments of the present invention. FIG. 8*a* schematically shows the sequence of a method for monitoring the condition of a laser machining head according to embodiments of the present invention.

In order to monitor the condition of a laser machining head 10 during a laser machining process using a previously trained ML model 20, the computing unit 14 receives and acquires current measurement data of the laser machining head 10, for example the temperature on optical elements or the intensity of scattered light, and optionally receives further data, in particular process data such as a current laser power from the laser source 12 (S11). The data may be preprocessed to smooth and/or interpolate them (S12). Said data are inferred either by the computing unit 14 itself or by an external computing unit (not shown) using the previously trained ML model 20 (S21) and, based thereon, estimated current condition data that indicate the estimated current condition of the laser machining head are determined or output (S22), for example an estimated focus shift or the estimated current condition of protective glasses (good, average, or bad). Steps S11, S12, S21 and S22 may be performed continuously and/or at specific time intervals during the laser machining process and may in particular be performed in parallel to one another.

Figure 9:
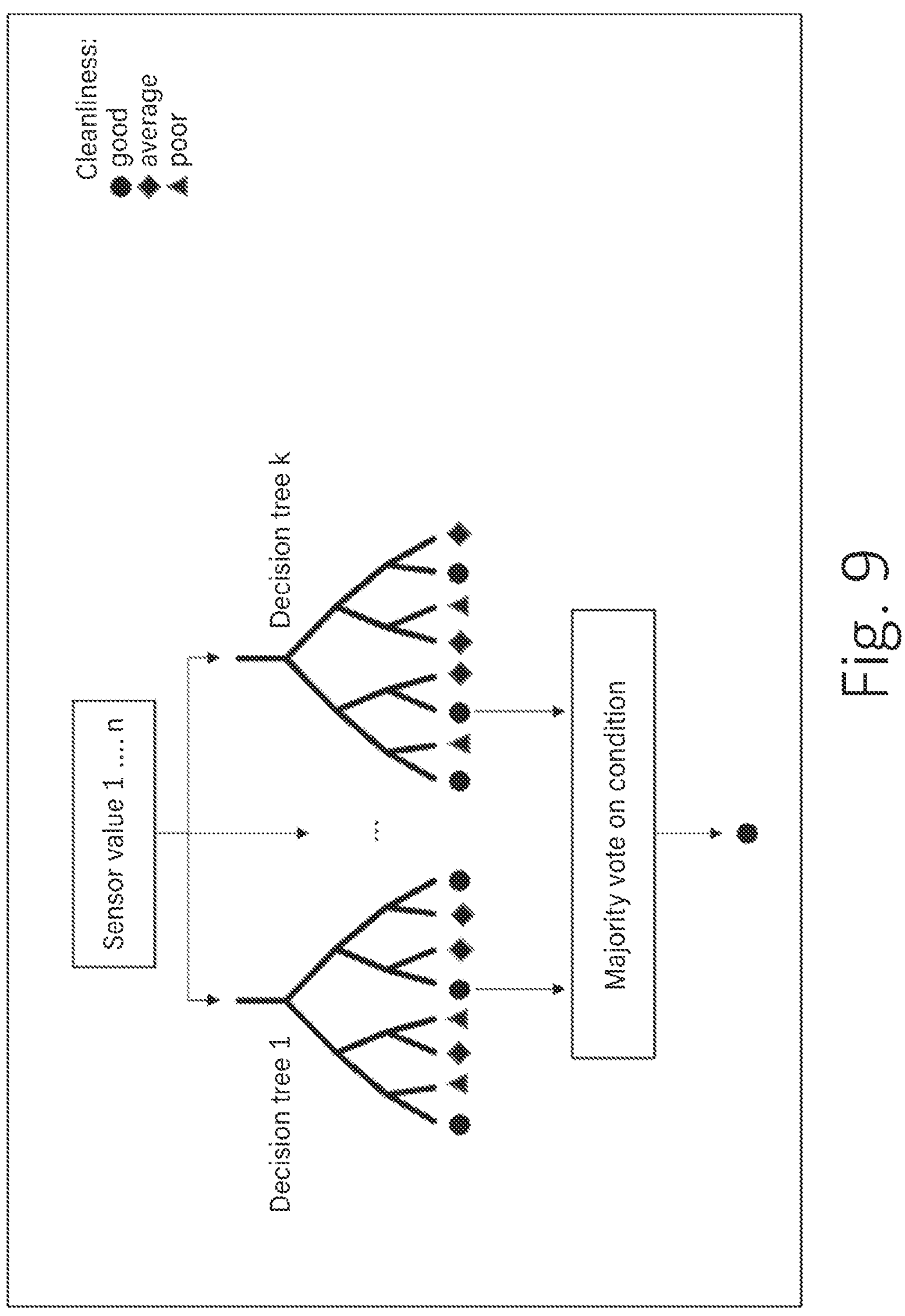
FIG. 9 schematically shows an exemplary sequence for determining estimated current condition variables based on an ML model using methods for monitoring the condition of a laser machining head according to embodiments of the present invention.

The inference (S21) may be performed using the ML model 20 described with reference to FIG. 6, for example. The estimated current condition value for describing the condition of the laser machining head is accordingly determined by the majority vote of the k decision trees based on the measurement data and the process data, as shown schematically in FIG. 9.

As a result or as an output vector of the ML model 20, for example by means of a classification or regression, estimated current condition data specifying or describing the condition of the entire laser machining head 10 and/or at least one element 13 of the laser machining head 10, for example an optical element 13 such as a protective glass, are output.

The output vector or the condition data may be output, for example, in the form of a degree of soiling in percent, a traffic light system ("red", "yellow", "green") and/or an estimated current focus shift. Furthermore, the output vector or the condition data may include an exact estimate of the remaining service life of an element, for example for preventive maintenance. This results in the advantage that elements are optimally utilized since no premature replacement is required and no unplanned or unforeseen failure of the elements occurs. The output vector or the condition data may be displayed and communicated to the operator 40 via an app or a GUI 19, for example on a system computer 16, the system control or CNC 18 or a web GUI (not shown). It is also possible for the computing unit 14 to cause the machining process to be stopped and/or to request intervention by an operator 40 based on the determined output vector or the condition data. It is also possible for the computing unit 14 to transmit the determined output vector or the determined condition data to the system control 18 and for the system control 18 to change process parameters based thereon in order to control the laser machining process. In this way, a machining result by the laser machining process can be ensured.

Figure 8B:
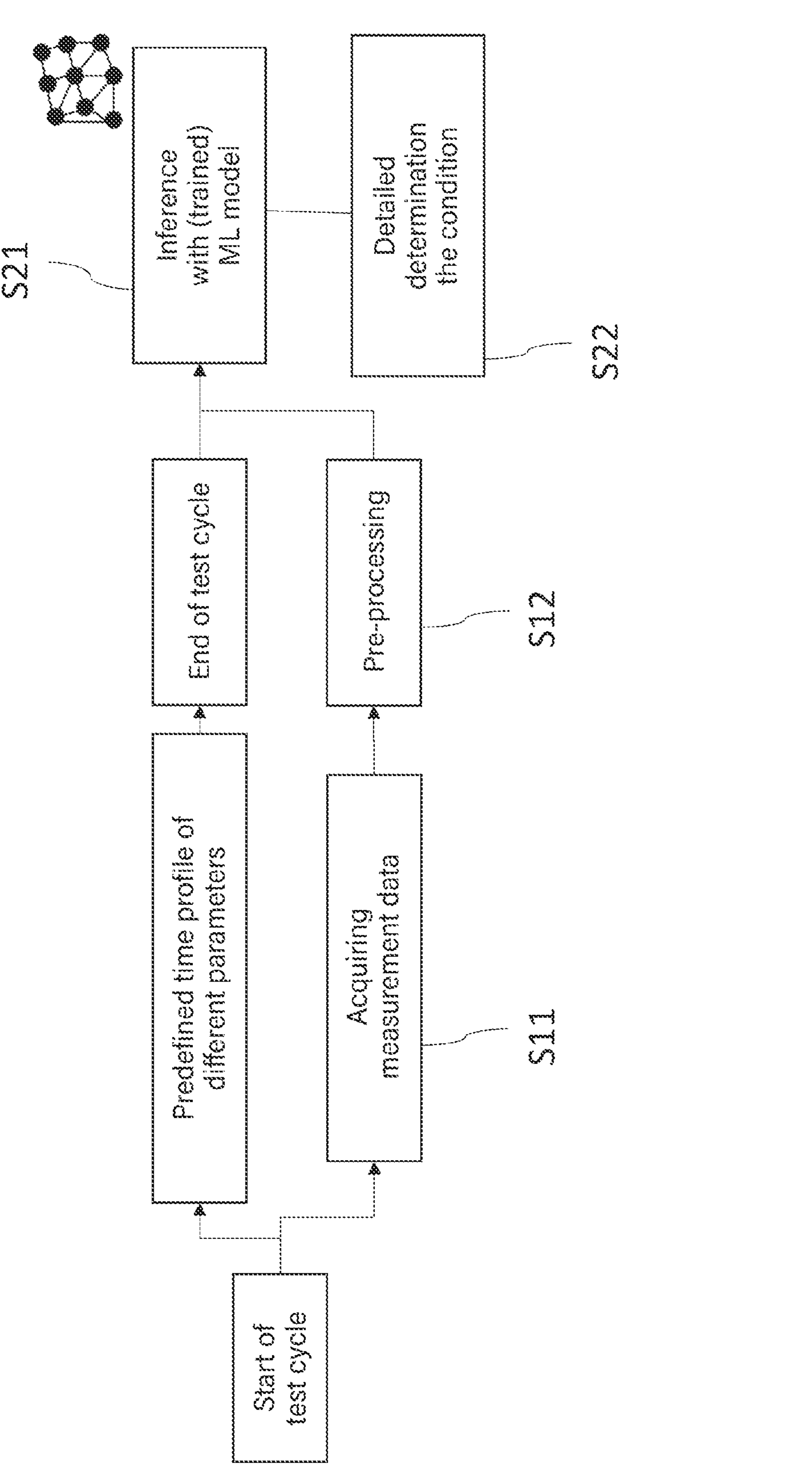
FIG. 8*b* schematically shows the sequence of a method for monitoring the condition of a laser machining head in a test cycle according to embodiments of the present invention.

As described above, the inference (S21) may be carried out either during a laser machining process or in a test cycle for condition monitoring with greater accuracy. The test cycle may correspond to a laser machining process with largely constant general conditions, for example a constant laser power and/or predefined time sequences. FIG. 8*b* schematically shows the sequence of a method for monitoring the condition of a laser machining head during a test cycle according to embodiments of the present invention.

Condition monitoring may be performed as part of an upstream or downstream inspection or test cycle. This has the advantage of a resulting higher level of accuracy. In both cases, the structure of the laser machining head or the laser machining system does not have to be changed and no additional tools such as reflective surfaces or camera systems are required.

The test cycle may in particular be a predefined test cycle that includes a defined time sequence or a defined time profile of various parameters, for example parameters of the laser source 12, the laser or the laser beam 28, parameters of the laser machining head 10 and/or parameters of other elements, for example machines, robots, axes, gas etc.

The test cycle may, for example, have one or more of the following features that define the machining parameters: The mean laser power Pmittel during the test cycle may be defined by Pmittel≥0.1 kW, in particular Pmittel≥0.5 kW. The duration T of the test cycle may be defined by T≤300 s. Furthermore, one or more focus positions of the laser beam 28 or optical positions (z-position) in the laser machining head 10 may be selected during the test cycle such that each optical element 13 is maximally illuminated at least once.

Optional features of the test cycle may include: During the test cycle, the laser machining head 10 may be subjected to a gas pressure p for at least 10 s (cumulated over the entire duration of the test cycle), corresponding to greater than or equal to the ambient pressure $p_{atm}$, i.e. $p \geq p_{patm}$. With the help of the application of pressure, soiling of the optical elements of the laser machining head 10 or an optical system of the laser machining head 10 is avoided during the test cycle. On the other hand, this allows for pressure sensors and the sealing of the laser machining head 10 to be checked. Furthermore, one or more focus positions or optics positions (z-position) in the laser machining head 10 may be selected during the test cycle in such a way that each optical element is minimally illuminated at least once.

The selected laser power for the test cycle aims at high applicability in the field, i.e. when the laser machining head 10 is used by the customer, and should be as low as possible. A short duration T aims at a high acceptance in the field and with the customers. And the maximum illumination of the optical elements means that soiling in the edge area of the optical elements can also be detected.

The steps S11, S12, S21, S22 of the test cycle shown in FIG. 8*b* essentially correspond to the steps S11, S12, S21, S22 shown in FIG. 8*a*. Steps S11, S12 may also be carried out continuously and/or repeatedly after predetermined time intervals during the test cycle. Steps S21, S22 may be carried out after the test cycle has ended. As a result, the condition of a laser machining head 10 or of an individual element 13, for example an optical system, can be determined, evaluated and monitored in detail.

The present invention is based on the use of machine learning models or algorithms for the holistic determination, evaluation and monitoring of a condition of a laser machining head or individual elements thereof, for example optical, mechanical and/or electrical elements. For example, an overall or holistic condition classification of the laser machining head may be specified as: “operates well”, “still operates”, “can/should no longer be used”, etc. Measures may be recommended based on the determined condition. A holistic model for determining the overall health of the laser machining head may consist of ML models which are optimized for individual elements of the laser machining head and may be used to determine the condition of the respective element, for example based on a combination of measurement data acquired from different sensors, such as scattered light, temperature and/or pressure sensors, and optionally also based on further data, in particular process data. The process data may include values or time profiles of various process parameters, for example laser parameters, in particular the laser power. The ML models may be based on random forest algorithms, for example. The result of an inference with the holistic model is used to determine the condition of the laser machining head, for example during a laser machining process or in a test cycle. The structure of a laser machining system including the laser machining head does not have to be changed and the laser machining process does not have to be interrupted. The ML models or algorithms may also take into account environmental influences and their complex influence on the individual elements, for example the outside temperature and the outside pressure.

Furthermore, the ML models or the ML algorithms offer the possibility of controlling or readjusting the laser machining process, up to a “closed loop” control of machining parameters such as focus position or feed rate. In addition, the method for condition monitoring according to embodiments of the present invention may be used or transferred to monitoring the condition of a laser machining head or individual (optical) elements in various types of laser machining processes, for example laser cutting, laser welding and laser cladding. A further advantage of the present invention is the reduction in the required know-how of an operator of the laser machining head or the laser machining system for detecting a fault due to a worn or degraded element. By means of the intelligent processing or analysis of the current measurement data or other data, for example current values of laser parameters or process parameters using the ML algorithms, the complex relationship between the sensors and the condition of elements of the laser machining head is output in an way interpretable for an operator. There is no need for measurement values to be interpreted for error analysis. Rather, the invention enables an intelligible, already interpreted assessment of the condition of individual elements or of the entire laser machining head, for example using a traffic light system, an estimate of the current dynamic focus deviation of the machining head and/or a time indication of the remaining service life.

Specific examples and embodiments of a method for monitoring the condition of a laser machining head are described below.

As already described above, the method for monitoring the condition of a laser machining head comprises the steps of: acquiring measurement data by means of at least one sensor unit arranged on or in the laser machining head, determining an input vector based on the acquired measurement data; and determining an output vector by applying a model trained by machine learning to the input vector, the output vector including estimated condition data of at least two elements of the laser machining head for determining the overall condition of the laser machining head.

In specific embodiments, the output vector may include estimated condition data, which include at least one of: “type of soiling of an optical element” (case 1), “degree of soiling of an optical element” (case 2) and “deviation of a current focus position of the laser beam from a target focus position” (case 3). In each of these specific embodiments, the input vector may be determined, for example, on the basis of process parameters, with the process parameters or process data comprising at least one of: a laser power, a focus position and/or an imaging ratio and/or a focal length. In each of these cases or combinations of cases, the acquired measurement data for determining the input vector may include at least one of: at least one temperature and at least one intensity of scattered light from an optical element.

In other words, the condition data, in particular a “type of soiling of an optical element”, a “degree of soiling of an optical element” and/or a “deviation of a current focus position of the laser beam from a target focus position” may each be estimated based on process data, such as a laser power, a focus position and/or an imaging ratio and/or a focal length and measurement data such as at least one temperature and at least one intensity of scattered light from an optical element.

The following, more specific embodiment of these possible combinations is an example: the condition data correspond to a "type of soiling of an optical element" and are estimated based on process data including a laser power and on measurement data including at least one temperature. Corresponding specific examples exist in all conceivable permuted combinations of these embodiments.

In further specific embodiments (referred to as case 4), condition data may include information about the functionality of the laser machining head, such as a leak, with the information being estimated based on process data, such as a gas pressure in an interior space of the laser machining head and/or a gas pressure (e.g. a specification on a gas valve), a nozzle diameter, a distance of the laser machining head from a workpiece and also based on measurement data including, for example, a gas pressure between two optical elements and/or an optical element.

In other words, in these specific embodiments, the output vector may include information about the functionality of the laser machining head, such as a leak, as estimated condition data. In this case in particular, the input vector may be determined, for example, on the basis of the following process parameters: a gas pressure in an interior space of the laser machining head and/or a gas pressure (e.g. a specification on a gas valve), a nozzle diameter, and a distance of the laser machining head from a workpiece. In one of these cases, measurement data may include, in particular, a gas pressure between two optical elements and/or an optical element.

In a further embodiment (referred to as case 5), information about the functionality of the laser machining head, for example a broken tape, may be based on process data comprising a focus position of the laser machining head and based on measurement data comprising electrical currents from or to an element and/or communication signals of an element.

Exemplary embodiments of algorithms are described below. First, the analysis of soiling of an optical element and the influence on condition data, such as the "deviation of a current focus position of the laser beam from a target focus position" (case 3 described above) is described.

In detail, a support vector regressor may be used and adjusted to analyze the influence of the temperature values and/or acquired data from scattered light sensors from FIGS. 3*a* to 3*d* on the amount of the deviation of a current focus position of the laser beam from a target focus position. In particular, the support vector regressor may be applied to a time span of several seconds.

Here, it is particularly advantageous to carry out a linear kernel optimization. A complex relationship between scattered light sensors and temperature sensors is taken into account in the regression of the deviation of a current focus position from an ideal condition with a theoretical initial focus position and is abstracted even if the data basis is small.

In this way, marginal cases that rarely occur, such as severe soiling (degree of soiling and/or type of soiling) of an optical element, can be reliably classified in the industrial environment without these cases ever having to have occurred before. It is therefore an abstraction of previously unknown cases of soiling.

When training an algorithm, for example an SVR algorithm, a training parameter C may be selected to be large, for example, in order to adapt the model to a specific optical imaging system. C is preferably in the range $0.1<C<2.0$, in particular in the range $0.4<C<1.5$. This corresponds to adjusting to a system. If a test data set is subsequently recognized well with the model, the model is typically sufficiently accurate and provides certainty in future unknown cases with a specific configuration of FIGS. 3*a* to 3*d*. The training parameter epsilon may be chosen as small as possible in order to limit the loss function. Epsilon is preferably in the range 0<epsilon<1.0, in particular in the range 0<epsilon<0.55. This usually results in a well-learned relationship between laser power, scattered light and temperature measurements at optics and their degradation for different soiling patterns. This corresponds to the tuning of complex interrelationships of the measurement values.

The use of a neural network for case 3 mentioned above is described in more detail below.

A neural network may be used in particular for direct live estimation or real-time estimation of the deviation from a current focus position of the laser beam. The input vectors or the input tensors are formed, for example, from at least one temperature and at least one intensity of scattered light from an optical element (corresponding to the measurement data) and in particular a laser power, a focus position and/or an imaging ratio and/or a focal length (corresponding to the process data). The output vector or output tensor returns the "deviation of a current focus position of the laser beam from a target focus position". A simple deep neural network, which consists of at least three hidden intermediate layers, is particularly suitable as the architecture of the neural network for live estimation. It achieves sufficient abstraction, which does not result in overfitting of the model in the case of medium-sized data sets and is relatively insensitive to noise with regard to the measurement data.

Next, a general estimation of the (laser machining) head condition will be described in more detail with reference to FIG. 10. The estimation of the overall head condition can be categorized, for example, into three initial conditions: initial condition A) corresponds to the optimal condition in which the head is operable, initial condition B) corresponds to a non-optimal condition in which the head is operable with restrictions and/or a warning message is present and initial condition C) corresponds to a faulty condition in which the head is not operable (anymore).

Figure 10:
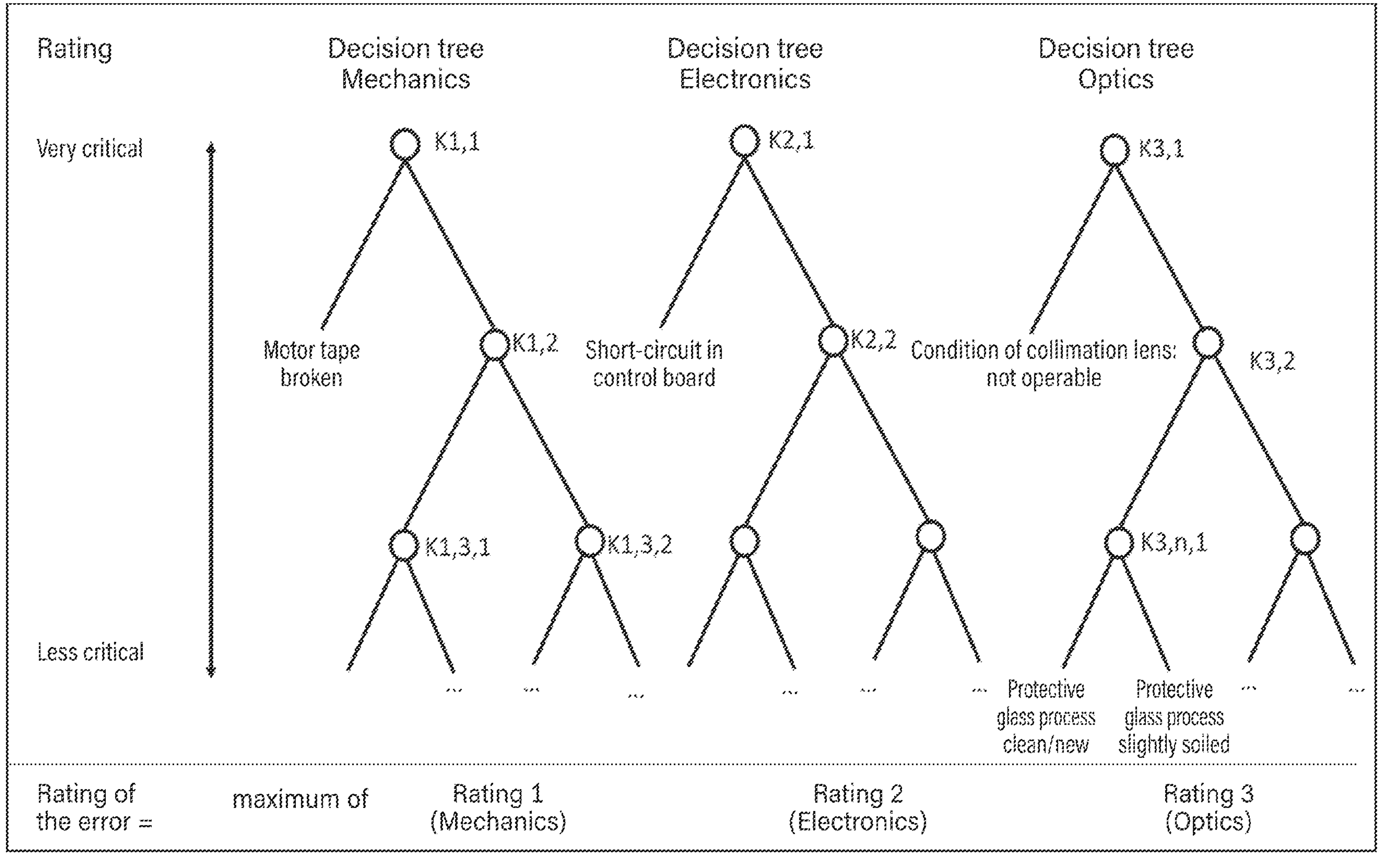
FIG. 10 is a schematic diagram of a decision tree representing an embodiment of a machine learning algorithm.

A decision tree representing an embodiment for a machine learning algorithm is shown in FIG. 10. The algorithm may, for example, be understood on the basis of readable decision structures and can therefore be adapted by a user. This allows user knowledge to be incorporated in a purposeful manner. Therefore, complex (by support vector regression SVR, neural networks NN or random forests RF) and simple relationships (fuzzy logic, decision tree from historical experiences of (human) users) may be combined. If, for example, a motor or a mechanical component fails (e.g. detected by a disproportionately high or low motor current), the decision may be entered directly based on empirical values.

As shown in FIG. 10, three different decision trees may be distinguished in detail: mechanics, electronics and optics. Each node Kx,y,z corresponds to decision-making based on a threshold value (e.g. when the measured temperature of a component exceeds a known specification from historical or previously acquired data) based on a machine learning algorithm (e.g. SVR, NN and/or RF) or based on discrete digital signals (e.g. communication signals of an electronic board such as error bits in a data transmission). The index x defines the respective decision tree, the index y the level within a decision tree and the index z the position of the node within a level.

The binary decision of a node is made between the categorization into "error" and "no error". In the case of "no error", one level deeper in the respective decision trees is iterated. In the case of "error", a value of the error is determined. The earlier and/or higher the determined error in the decision tree, the more important is the error in the individual decision tree. The general, current head condition may thus be determined on the basis of the maximum error of all decision trees. For example, the errors in the top nodes (Kx,1) have a value of 1.0. In the lowest node (Kx,n,m), the errors have a value of 0.0. In this case, m indicates all nodes in the lowest level n. If the maximum error weighting of the three decision trees is 1.0, the laser machining head is no longer operable and the condition C) described above is present. Between 1.0 and 0.0, not including 1.0 and 0.0, the head is in condition B). If the score is 0.0, the head is in condition A).

All statements given herein quantified by numerical values are potential statements and may deviate in particular by between 1-5% from the numerical values mentioned.

LIST OF REFERENCE SYMBOLS

1 workpiece
10 laser machining head
11 interior space of the laser machining head
12 laser source/laser
13 elements of the laser machining head
14 computing unit
15 housing of the laser machining head
16 system computer
18 system control/CNC
19 GUI
ML model
22 element-specific ML model
24 holistic ML model
40 operator
50 expert knowledge
60 data pool/data basis

The invention claimed is:

1. A method for monitoring the condition of a laser machining head, said method comprising the steps of:
- acquiring measurement data by means of at least one sensor unit arranged on or in said laser machining head;
- determining an input vector based on the acquired measurement data; and
- determining an output vector by applying a model trained by machine learning to the input vector;
- wherein the output vector contains estimated condition data of at least two elements of said laser machining head for determining the overall condition of said laser machining head;
- wherein the model comprises a plurality of first models and a second model, wherein each of the plurality of first models is used to determine condition data of a respective element of the laser machining head, wherein the second model is used to determine condition of said laser machining head from the condition data of the elements obtained from the first models.

2. The method according to claim 1, wherein the condition data include: a type of soiling of an element, a degree of soiling of an element, a degree of wear of an element, a degree of aging of an element, a remaining service life of an element, a changed focal length of an element, a deviation of a current focus position of the laser beam from a target focus position, and/or an indication of the functionality of the laser machining head.

3. The method according to claim 1, wherein the input vector is further determined based on at least one process parameter.

4. The method according to claim 3, wherein the at least one process parameter comprises one of: a laser power, a focus position of the laser machining head, a gas pressure, a feed rate of the laser machining head, an imaging ratio of the laser machining head, a focal length of the laser machining head, or a distance of the laser machining head from a workpiece.

5. The method according to claim 1, wherein the at least one element comprises at least one of: an optical element, a protective glass, a beam splitter, a mirror, a lens, a lens group, a focusing lens, focusing optics, collimating optics, a collimating lens, a mechanical element, an actuator, a motor, a nozzle, a nozzle electrode, a ceramic part, a cutting gas duct, a cooling element, an electrical and/or electronic element, a board, a control board, a communication board, a power component, and a motor control.

6. The method according to claim 1, wherein the measurement data include values of at least one of the following measurement variables: humidity, humidity in an interior space of said laser machining head, humidity in an area surrounding said laser machining head, temperature, a temperature of an area surrounding said laser machining head, a temperature of a housing of said laser machining head, a temperature in an interior space of said laser machining head, a temperature of an element of said laser machining head, a coolant temperature, a thermal radiation intensity, a radiation intensity, a scattered light intensity, an intensity of a radiation reflected and/or scattered by an element of said laser machining head, an intensity of scattered light in an interior space of said laser machining head, an intensity of scattered light from an optical element, electric currents from or to an element, electrical voltages at an element, communication signals of an element, a gas pressure in an interior space of said laser machining head, a gas pressure between two optical elements and/or on an optical element, an acceleration of an element of said laser machining head and/or said laser machining head, and a vibration of an element of said laser machining head and/or said laser machining head.

7. The method according to claim 1, wherein the model is based on at least one of the following algorithms: random forest, support vector machine, a neural network, a recurrent neural network, a convolutional neural network and a deep convolutional neural network.

8. The method according to claim 1, wherein the model is configured for transfer learning and/or is adaptable for reinforcement learning.

9. The method according to claim 1, wherein said method for condition monitoring is carried out during a laser machining process and/or wherein the output vector is determined repeatedly and/or continuously during a laser machining process.

10. The method according to claim 1, further comprising:
- outputting the output vector to an operator of said laser machining head or information about a condition of the at least one element and/or the laser machining head by means of a user interface; and/or
- outputting at least one recommendation for action to the operator of said laser machining head by means of a user interface.

11. The method according to claim 1, wherein said method for condition monitoring is carried out during a laser machining process and further comprises at least one of the steps of:

controlling the laser machining process by changing at least one process parameter based on the determined output vector; and stopping the laser machining process.

12. A laser machining system, comprising:

a laser machining head having at least one sensor unit for acquiring measurement data which is arranged on or in a housing of said laser machining head; and a computing unit configured to determine an input vector based on the acquired measurement data and to determine an output vector by applying a model trained by machine learning to the input vector;

wherein the output vector contains estimated condition data of at least two elements of said laser machining head for determining the overall condition of said laser machining head, wherein the model comprises a plurality of first models for determining condition data of one element of said laser machining head each and a second model for determining condition data of said laser machining head from the condition data of the elements obtained from the first models, and wherein the model is obtained using transfer learning and/or reinforcement learning.

13. The laser machining system according to claim 12, wherein the sensor unit includes at least one of the following sensors: a humidity sensor, a temperature sensor, a photodetector, a pressure sensor, a scattered light sensor, an acceleration sensor, a current sensor, a voltage sensor, a distance sensor, a sound sensor, an acceleration sensor, and a vibration sensor.

14. A method for monitoring the condition of a laser machining head, said method comprising the steps of:

acquiring measurement data by means of at least one sensor unit arranged on or in said laser machining head;

determining an input vector based on the acquired measurement data; and determining an output vector by applying a model trained by machine learning to the input vector;

wherein the output vector contains estimated condition data of at least two elements of said laser machining head for determining the overall condition of said laser machining head;

wherein the model comprises a plurality of first models for determining condition data of one element of said laser machining head each and a second model for determining condition data of said laser machining head from the condition data of the elements obtained from the first models, wherein the first models and the second model are based on at least one of the following algorithms or combinations thereof: random forest, support vector machine, fuzzy logic, fuzzy decision tree, a decision tree, a neural network, a recurrent neural network, a convolutional neural network, and a deep convolutional neural network.

* * * * *